US008165053B2

(12) United States Patent
Xu et al.

(10) Patent No.: US 8,165,053 B2
(45) Date of Patent: Apr. 24, 2012

(54) METHOD FOR SUPPORTING MBMS SERVICE TRANSMISSION IN LTE SYSTEM

(75) Inventors: Lixiang Xu, Beijing (CN); Hong Wang, Beijing (CN); Xiaoqiang Li, Beijing (CN); Chunying Sun, Beijing (CN); Yanmin Zhu, Beijing (CN)

(73) Assignees: Samsung Electronics Co., Ltd., Maetan-Dong, Yeongtong-Gu, Suwon-Si, Gyeonggi-Do (KR); Beijing Samsung Telecom R&D Center, Haidian District, Beijing (CN)

( * ) Notice: Subject to any disclaimer, the term of this patent is extended or adjusted under 35 U.S.C. 154(b) by 829 days.

(21) Appl. No.: 12/220,469

(22) Filed: Jul. 24, 2008

(65) Prior Publication Data
US 2008/0293399 A1  Nov. 27, 2008

Related U.S. Application Data

(63) Continuation of application No. PCT/KR2007/000421, filed on Jan. 24, 2007.

(30) Foreign Application Priority Data

Jan. 24, 2006  (CN) .......................... 2006 1 0001694

(51) Int. Cl.
H04H 20/71  (2008.01)

(52) U.S. Cl. ...... 370/312; 370/329; 370/432; 455/422.1

(58) Field of Classification Search .................. None
See application file for complete search history.

(56) References Cited

U.S. PATENT DOCUMENTS

2002/0091860 A1* 7/2002 Kalliokulju et al. .......... 709/247
2002/0107964 A1* 8/2002 Tomoike ....................... 709/225
2003/0224794 A1* 12/2003 Kim et al. ..................... 455/445
2004/0085926 A1* 5/2004 Hwang et al. ................ 370/328
2004/0266440 A1* 12/2004 Fuchs et al. .................. 455/445
2005/0094670 A1* 5/2005 Kim .............................. 370/477
2005/0192021 A1 9/2005 Lee et al. ................... 455/452.2
2006/0171369 A1* 8/2006 Ostrup et al. ................. 370/349

(Continued)

OTHER PUBLICATIONS

3rd Generation Partnership Project (3GPP); Requirements for Evolved UTRA (E-UTRA) and Evolved UTRAN (E-UTRAN); Technical Specification Group Radio Access Network; Dec. 2005; 3GPP TR 25.913 V7.2.0.

(Continued)

Primary Examiner — Donald Mills
(74) Attorney, Agent, or Firm — Cha & Reiter, LLC

(57) ABSTRACT

A method for supporting Multicast Broadcast Multimedia Service (MBMS) data transmission in a Long-term evolution (LTE) system includes a network entity (ECN) to which a user equipment (UE) is registered, receives an Activate MBMS context request message from the UE, and sends a Create MBMS UE Context Request message to a ECN that offers MBMS service. The ECN that offers MBMS service performs an authorization process with a Broadcast and Multicast Service Center (BM-SC) and sends a "Create MBMS UE Context Response" message to the ECN to which the UE is registered. The ECN to which the UE is registered sends an Activate MBMS Context Accept message to the UE. With the methods for supporting the transmission of MBMS data in the LTE system according to present invention, both the BM-SC and the ECN can find the downstream node so that service transmission paths may be found for MBMS data.

10 Claims, 25 Drawing Sheets

U.S. PATENT DOCUMENTS

2008/0037468 A1\* 2/2008 Zisimopoulos et al. ...... 370/331

OTHER PUBLICATIONS

3rd Generation Partnership Project (3GPP); "Multimedia Broadcast/Multicast Service (MBMS); Architecture and Functional Description (Release 6);" Technical Specification Group Services and System Aspects; Dec. 2005; 3GPP TS 23.246 V6.9.0.

Ivankovic, Tonci; "Support of Multimedia Broadcast/Multicast Service in UMTS Networks;" 8th International Conference on Telecommunications—ConTEL 2005; Jun. 15-17, 2005.

\* cited by examiner

METHOD FOR SUPPORTING MBMS SERVICE TRANSMISSION IN LTE SYSTEM

CLAIM OF PRIORITY

The present application is a continuation of international application PCT/KR2007/000421 filed on Jan. 24, 2007, which in turn claims a priority to a Chinese Patent Application 200610001694.6, filed on Jan. 24, 2006.

BACKGROUND OF THE INVENTION

1. Field of the Invention

The present invention relates to a method for supporting Multicast Broadcast Multimedia Service (MBMS) service transmission in a mobile communication system Long-term evolution (hereinafter referred to as LTE) system proposed by the 3$^{rd}$ Generation Mobile Communication System Partnership Project (hereinafter referred to as 3GPP).

2. Description of the Related Art

FIG. 1 illustrates an example of an MBMS system structure. The MBMS network structure is based on a core network of General Packet Radio Service (hereinafter referred to as GPRS), and added with new network elements. Referring now to the MBMS system structure shown in FIG. 1, a Broadcast and Multicast Service Center (hereinafter referred to as BM-SC) (101) is the service control center of MBMS system. A Gateway GPRS Supporting Node 102 (hereinafter referred to as GGSN) and Service GPRS Supporting Node 103 (hereinafter referred to as SGSN) comprise the transmission network of MBMS service and provides a route for data transfer. Universal Mobile Telecommunication System (UMTS) Terrestrial Radio Access Network 104 (hereinafter referred to as UTRAN) provides radio resources for an MBMS service over the air-interface. User Equipment 105 (hereinafter referred to as UE) is a terminal device for data receiving. Home Location Register 106 (hereinafter referred to as HLR) saves user related data and provides services like user authentication. Uu 107 is a radio interface, and Iu 108 represents an interface between the access network and the core network. Iu resources used by MBMS service are not dedicated to one user, but for all users using this service.

FIG. 2 illustrates the sequence of a process in which an existing UE joins in the MBMS service.

Referring now to FIG. 2, in step 201, the UE initiates a process of establishing the Packet Data Protocol (PDP) context. Having been established successfully, the PDP Context is saved in the UE, SGSN and GGSN, and a signaling connection in PS domain is established between the UE and the GGSN. The intermediate devices for the signaling connection are the Radio Access Network (hereinafter referred to as RAN) and the SGSN.

In step 202, the UE transmits an Internet Multicast Management Protocol (hereinafter referred to as IGMP) join in message to the GGSN through the signaling connection established in step 201. The message includes a parameter of an IP multicast address for identifying a certain MBMS multicast service or certain multicast service in the external data network.

In step 203, the GGSN and BM-SC perform signaling interaction to authenticate the UE.

In step 204, GGSN sends a "MBMS Notification Request" message to the SGSN, which includes the parameters of the UE identifier and the IP multicast address.

In step 205, the SGSN sends to the UE a message requesting activation of the MBMS context after the SGSN receives the message in step 204. The message includes the UE identifier and the IP multicast address.

In step 206, the UE sends an "Activate MBMS Context Request" message to the SGSN after receiving the message in step 205. This message includes an IP multicast address, an Access Point Name (hereinafter referred to as APN), a MBMS_NSAPI (Network Service Access Point Identifier) and MBMS-bearing capacity of the UE.

In step 207, the SGSN sends a "MBMS Notification Response" message to the GGSN. This MBMS Notification Response message includes a cause value. The cause value indicates whether the MBMS context has activated successfully due to the SGSN or UE or not. Once receiving the response message of failure or the activation is timeout in the GGSN, the GGSN may return the IP Multicast Access (which is defined in 3GPP TS29.061).

In step 208, if necessary, a security encryption process can be carried out between the UE and the SGSN.

In step 209, the SGSN sends a request message for establishing the MBMS context to the GGSN, which includes the IP multicast address and an APN.

In step 210, the GGSN performs signaling interaction with the BM-SC to authenticate MBMS service and the UE after receiving the message in step 209.

In step 211, if the GGSN has not established the bearer context for the MBMS service yet, the GSSN sends an "MBMS Registration Request" message to the BM-SC. This MBMS Registration Request message includes an IP multicast address and an APN. The BM-SC sends an "MBMS Registration Response" message to the GGSN, which includes the MBMS bearer context information. BM-SC adds an identifier of the GGSN to a downlink node list of the BM-SC bearer context.

If a Temporary Mobile Group Identifier (hereinafter referred to as TMGI) has not yet been allocated to this MBMS service, the BM-SC allocates a new identifier, and transfers this identifier to the GGSN and the SGSN by the message of an "MBMS Registration Response", and to the UE by the message of "Activate MBMS Context Accept" (215).

If the bearer context has been activated, a session start process between the BM-SC and the GGSN will be initiated by the BM-SC.

In step 212, the GGSN generates the MBMS UE context and transfers the "Create MBMS Context Response" message to the SGSN.

In step 213, if the SGSN has not yet established the bearer context for the MBMS service, the SGSN sends the "MBMS Registration Request" message to the GGSN. This message includes the IP multicast address and the APN. The GGSN sends the "MBMS Registration Response" message to the SGSN, including the MBMS bearer context information. The GGSN adds an identifier of this SGSN to the downlink node list of the GGSN bearer context.

In step 214, if at least one RAB in PS domain has been established for this UE, the SGSN transfers the MBMS UE context information to the RAN.

In step 215, the SGSN sends the "Activate MBMS context accept" message to the UE. It is not necessary to wait for the completion of step 212 to send this message by SGSN.

FIG. 3 illustrates the process of starting an existing MBMS. In step 301, the BM-SC sends a "Session Start Request" message to the GGSN in a downstream node list of MBMS bearer context, indicating the start of the transmission and offering the attributes of MBMS session such as the Temporary Mobile Group Identifier (hereinafter referred to as TMGI), the quality of service (hereinafter referred to as QoS), the MBMS service area, the session identifier, the estimated time period of the session, broadcast or multicast, etc. and 2G/3G (the $2^{nd}$ or $3^{rd}$ generation) indicator. The BM-SC sets the state of MBMS bearer context as activated. The GGSN creates the MBMS bearer context for the broadcast MBMS service. The GGSN saves session attributes and the downstream node list in the MBMS bearer context and sets the state of the bearer context as activated. The GGSN sends a "Session Start Response" message to the BM-SC.

In step 302, the GGSN sends a "MBMS Session Start Request" message to the SGSN in the downstream node list of MBMS bearer context. This message includes the session attributes such as the TMGI, the QoS, the MBMS service area, the session identifier, the estimated time period of the session, broadcast or multicast, etc. and 2G/3G indicator. The SGSN creates the MBMS bearer context for the broadcast MBMS service. The SGSN saves the session attributes and the 2G/3G indicator in the MBMS bearer context and sets the state of the bearer context as activated. The SGSN sends the "Session Start Response" message to the GGSN, including the Tunnel End Identifier (hereinafter referred to as TEID) through whose bearer plane GGSN transmits MBMS data. For one MBMS bearer service, if the SGSN receives several "MBMS session start request" messages, the SGSN establishes the bearer plane with only one GGSN.

In step 303, the SGSN sends the "MBMS Session Start Request" message to the BSC (Base Station Controller) and/or the RNC both connected with the SGSN. With the 2G/3G indicator, the SGSN indicates whether the "MBMS Session Start Request" message is sent to either BSCs or RNCs or both. This message includes session attributes such as the TMGI, the QoS, the MBMS service area, the session identifier, the estimated time period of the session, broadcast or multicast and so on. For the multicast bearer service, the SGSN includes the number of UEs that locate in each routing area (hereinafter referred to as RA) and has joined in MBMS service and stays in packet mobile management idle mode (hereinafter referred to as PMM-IDLE).

For the broadcast MBMS bearer service, the BSC/RNC creates the MBMS bearer context. The BSC/RNC in Iu mode saves the session attributes in the MBMS service context, and sets the MBMS service context as activated state and sends the "MBMS Session Response" message to the SGSN. The RNC or BSC (which is in Iu mode) includes TEID in the response message. TEID is used by the SGSN as the bearer plane for the transmission of MBMS data. To one MBMS bearer service, if the BSC or the RNC receives several "MBMS session start request" messages, it establishes the bearer plane with only one SGSN.

In step 304, the BSC/RNC establishes necessary radio resources to transmit the MBMS data to related UEs.

The existing MBMS UE connection process is illustrated in FIG. 4. The purpose of MBMS UE connection process is to report to the RNC whether the UE with Iu packet domain signaling connection joins or leaves one or more MBMS services. Detailed descriptions on this process are given below.

In step 401, the CN sends a "MBMS UE Connection Request" message to the RNC. This message includes a TMGI list indicating whether the UE has joined in but is not connected with UTRAN, or the UE has left but not notified to UTRAN, a P2P Radio Access Bearer (hereinafter referred to as RAB) Identifier.

In step 402, the RNC receives the "MBMS UE Connection Request" message. The RNC adds UE into the MBMS service context for the TMGI that indicates the UE has joined in but is not connected with UTRAN. If there is no MBMS service context, the RNC creates the corresponding one. If the UE is in the cell under the control of the DRNC, the UE connection process is implemented for Iur interface. For the TMGI that indicates UE has left MBMS but not connected with UTRAN, the RNC deletes the relevant UE from the MBMS service context. Having processed all TMGIs, the RNC sends a "MBMS UE Connection Response" message to the CN, reporting the unsuccessful connection or to try to connect and the causes.

Disadvantages like poor performance when updating, excessive time spent on the establishment of a call, a complex system structure etc., lie in the existing system structure of 3GPP. So that standardization is being done to LTE by the 3GPP standardization organization. For the requirement of LTE, companies have proposed desired LTE system structures.

FIG. 5 illustrates an example of a desired LTE system structure. For example, the exemplary LTE system integrates the original functions of the RNC and Node B into a network entity (hereinafter called ERAN 502), and integrates the functions of SGSN and GGSN into a network entity (hereinafter called ECN 503). Here, the packet data compression protocol (hereinafter referred to as PDCP) is the original function of RNC. It can be placed either in the ECN or ERAN of LTE. In this way, by reducing network nodes, the system is simplified and system delay is decreased. 504 E-PDN is the external public data network, providing data resources. Here, the UE 501 is similar to UE 105 of FIG. 1.

One proposal is to divide the ERAN 502 into two network node equipments with one similar to the original function of Node B, the other similar to the original function of RNC, or with different function combinations for RNC and Node B. Some company suggests that the ECN is divided into the user plane entity and the control plane entity on the basis of function. In LTE, the function entity (the function part corresponding to original UTRAN) related to the access network is called EUTRAN (enhanced UTRAN).

According to the LTE system structure, the problem about transmitting MBMS service has not been solved with the existing standard. In the original structure, the MBMS data is transmitted from the BM-SC to the RNC where the UE locates through the GGSN and the SGSN. (For details, referring to FIG. 3 and the corresponding description). Here, the SGSN saves the MBMS UE context and the UE context (information such as the state of UE, the RNC where the UE in PMM connection mode locates, the Routing Area (hereinafter referred to as RA) where the UE in PMM idle mode locates). Therefore, the SGSN may find the downstream RNC. In the LTE, if not all ECNs offer data routing for each MBMS service, it is possible that ECN offering MBMS service is not the UE-registered one. In this case, the problem comes across the ECN that offers the MBMS service how to find the downstream nodes.

SUMMARY OF THE INVENTION

Therefore, an object of present invention is to provide a method for supporting the transmission of MBMS service in LTE system.

According to one exemplary aspect of present invention, a method for supporting transmission of MBMS data in a LTE system, the method may includes the steps of:

an ECN that an UE is registered, receiving an "Activate MBMS context request" message from the UE;

the ECN, sending a "Create MBMS UE Context Request" message to an ECN that offers MBMS service;

the ECN that offers MBMS service, performing an authorization process with a BM-SC;

the ECN that offers MBMS service, sending a "Create MBMS UE Context Response" message to the ECN that the UE is registered; and the ECN that the UE is registered, sending an "Activate MBMS Context Accept" message to the UE.

According to another exemplary aspect of present invention, a method for supporting transmission of MBMS data in a LTE system, the method may include the steps of:

an ECN that an UE is registered, sending a "UE Context update request" message to an ECN that offers MBMS service; and the ECN that offers MBMS service, sending a "UE Context Update Response" message to the ECN that the UE is registered.

According to still another exemplary aspect of present invention, a method for supporting transmission of MBMS data in a LTE system, the method may include the steps of:

an ECN that an UE is registered, sending an "UP establishment request" message to an ERAN, the message including MBMS UE context information; and the ERAN, sending an "UP establishment response" message to the ECN that the UE is registered.

According to yet another exemplary aspect of present invention, a method for supporting transmission of MBMS data in a LTE system, the method may include the steps of:

a UE, sending an "IGMP join" message to an ECN;

an ERAN, receiving an "UE connection request" message from the ECN;

sending a "IGMP join" message to a BM-SC, if the ERAN has not yet registered the MBMS service; and the BM-SC, adding the ERAN to a downstream node list of MBMS bearer context.

According to even another exemplary aspect of present invention, a method for supporting transmission of MBMS data in a LTE system, the method may include the steps of:

a UE, sending an "IGMP Join" message to an ECN;

an ERAN, receiving a "UE Connection Request" message from the ECN;

sending a "MBMS registration request" message to a BM-SC, if the ERAN has not yet registered MBMS service;

the BM-SC, adding the ERAN into a downstream node list of MBMS bearer context; and the BM-SC, sending a "MBMS Registration Response" message to the ERAN.

According to another exemplary aspect of present invention, a method for supporting the transmission of MBMS data in a LTE system, the method may include the steps of:

when a MBMS session starts, a BM-SC, sending a "MBMS Session Start Request" message to at least one ERAN in a downstream node list of MBMS bearer context;

the ERAN, sending a "MBMS Session Start Response" message to the BM-SC; and the ERAN, establishing necessary radio resources for the UE that have joined the MBMS service.

With the methods for supporting MBMS data transmission in the LTE system according to present invention, both the BM-SC and the ECN can find the downstream node so that service transmission paths can be found for MBMS data. According to an exemplary aspect of the present invention, providing MBMS UE context to the radio resource management equipment is proposed to simplify the signaling flow so that the system efficiency is improved.

BRIEF DESCRIPTION OF THE DRAWINGS

The above features and advantages of the present invention will become more apparent from the following detailed description when taken in conjunction with the accompanying drawing in which.

DETAILED DESCRIPTION

The exemplary embodiment of present invention will be described with reference to the drawings. For the purposes of clarity and simplicity, details about known functions or structures may be omitted so as not to obscure appreciation of the subject matter of the present invention by a person of ordinary skill in the art.

Figure 1:
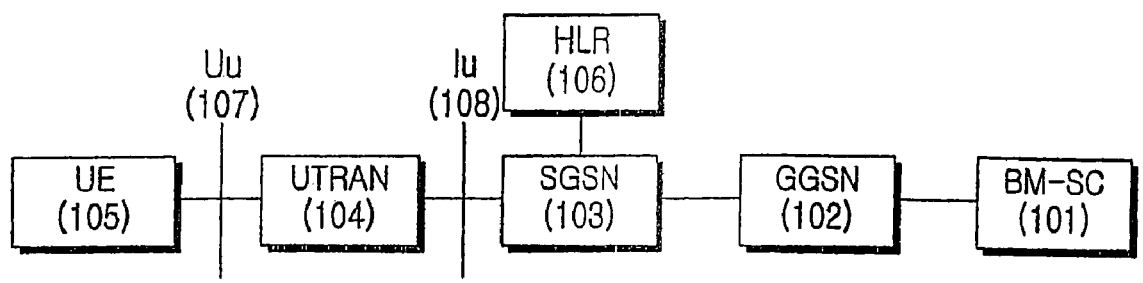
FIG. 1 shows a logic network apparatus for MBMS service.
Figure 2:
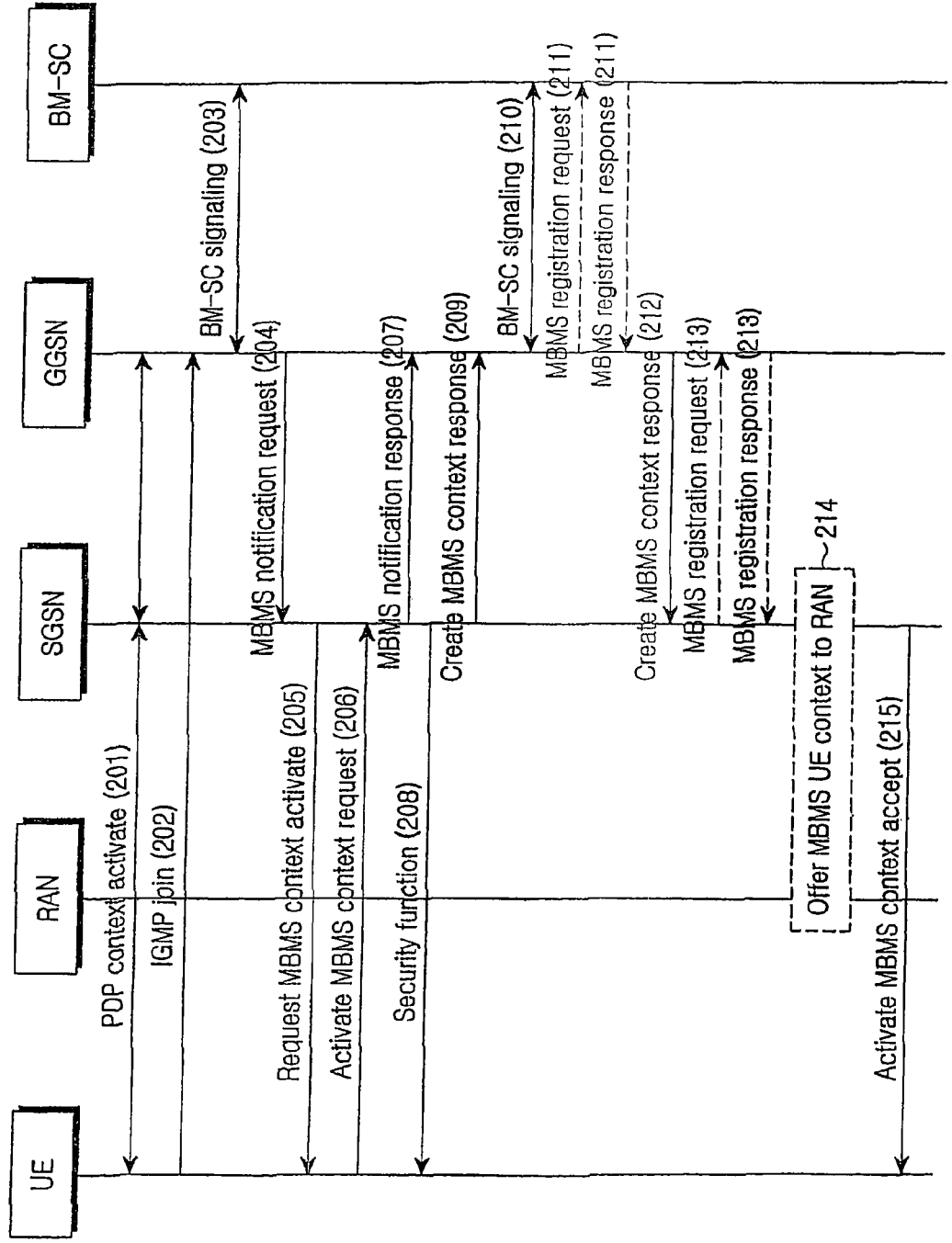
FIG. 2 illustrates an existing process that UE joins in MBMS service.
Figure 3:
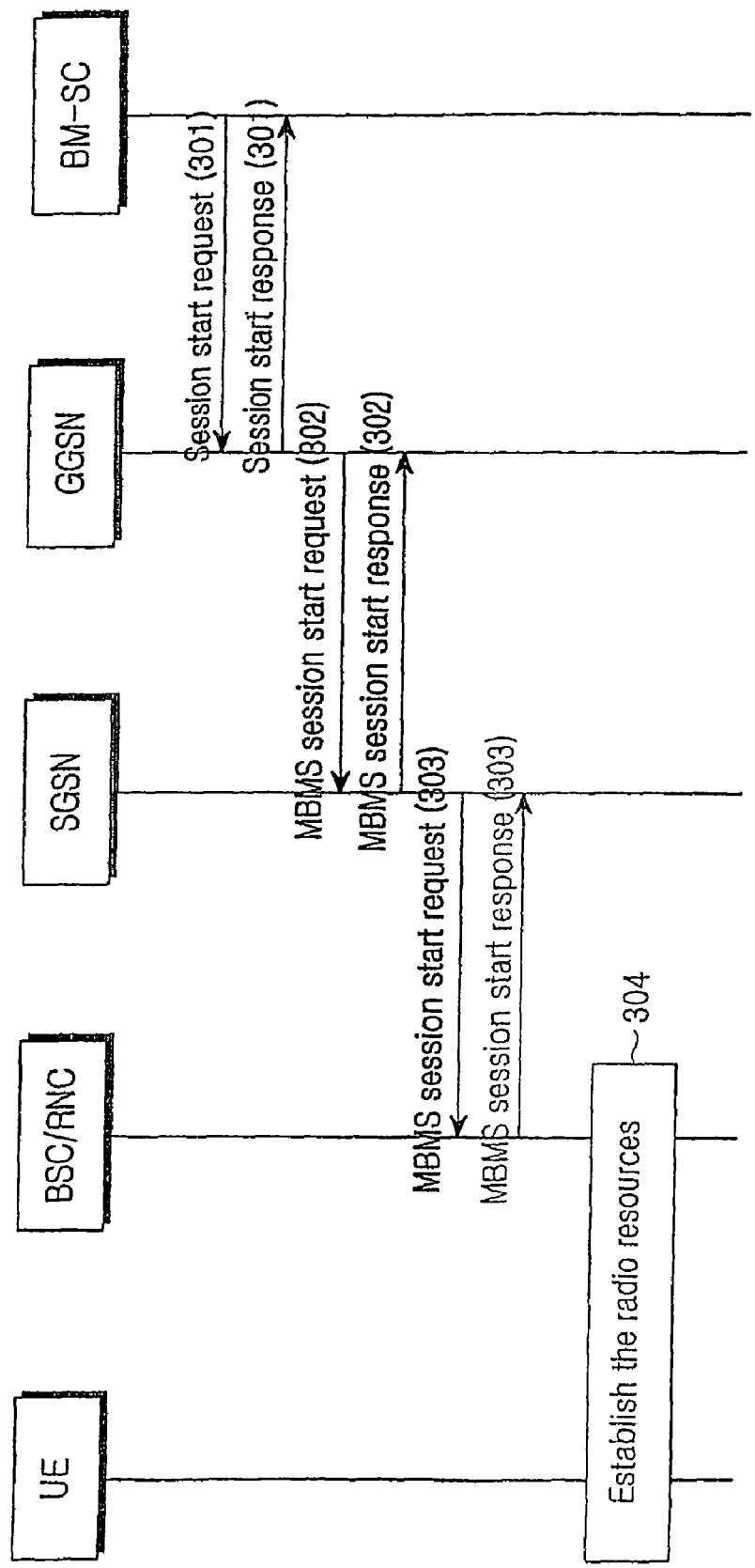
FIG. 3 illustrates an existing process that the MBMS session starts.
Figure 4:
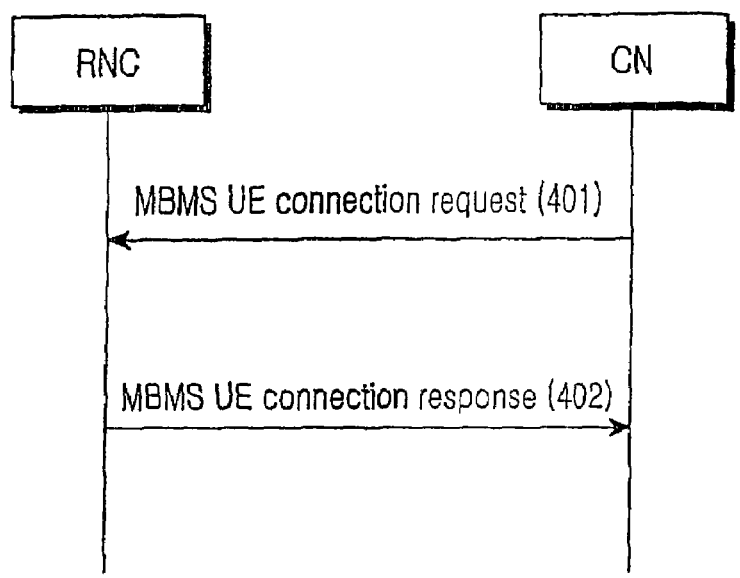
FIG. 4 illustrates an existing MBMS UE connection process.
Figure 5:
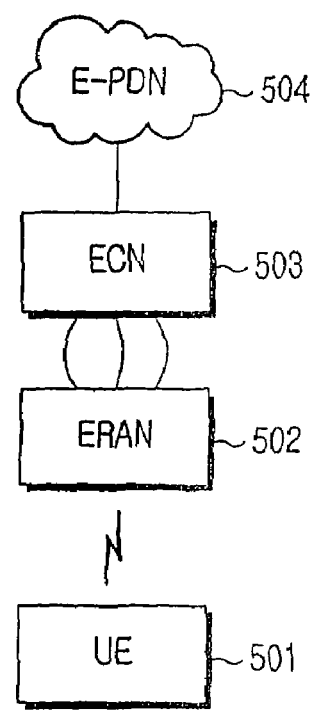
FIG. 5 shows a LTE system structure according to present invention.
Figure 6:
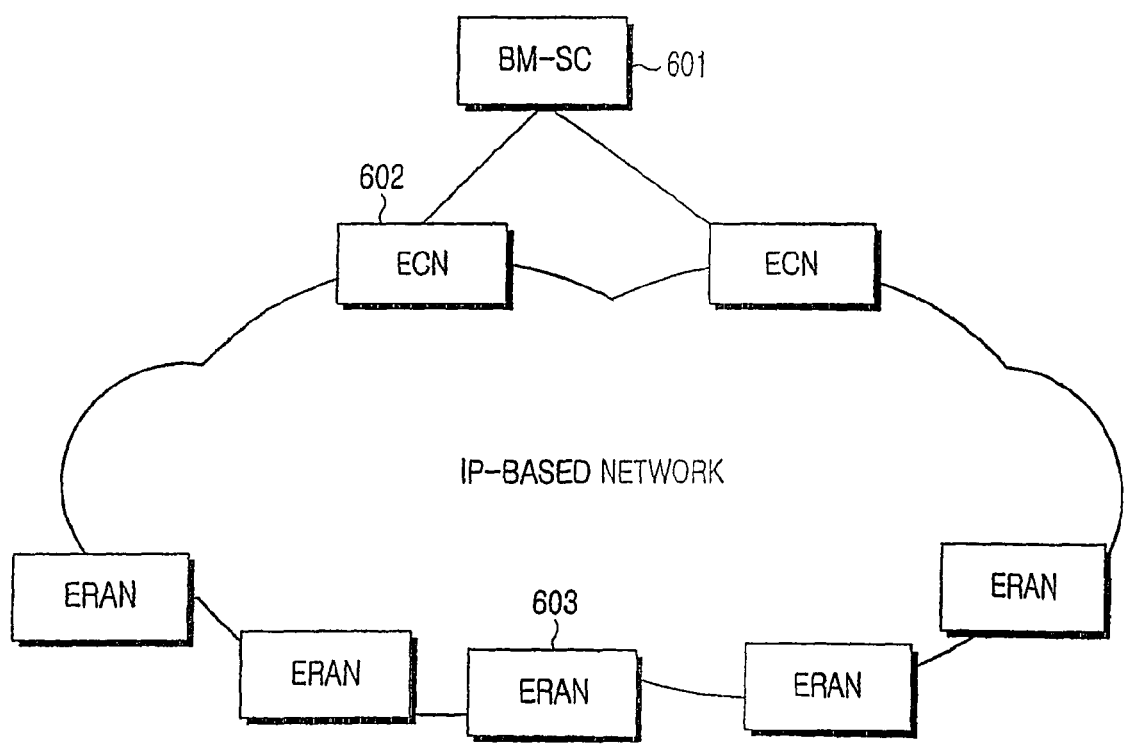
FIG. 6 shows a logic network apparatus for MBMS service on the basis of the LTE system structure.

On the basis of an LTE core network, FIG. 6 shows a MBMS network structure with the addition of new network element BM-SC. Here, similar to the description in FIG. 1, 601 denotes a service control center of MBMS system. ECN 602 and ERAN 603 are consistent with the network nodes 502 and 503 respectively shown in FIG. 5. The function of ECN is to initiates processes such as establishing and releasing the bearer, routing MBMS data to proper downstream node equipments and indicating the MBMS function support for UE. The function of ERAN is to effectively transmit MBMS data to specify MBMS service areas, MBMS paging, support MBMS accompanied services.

Figure 7:
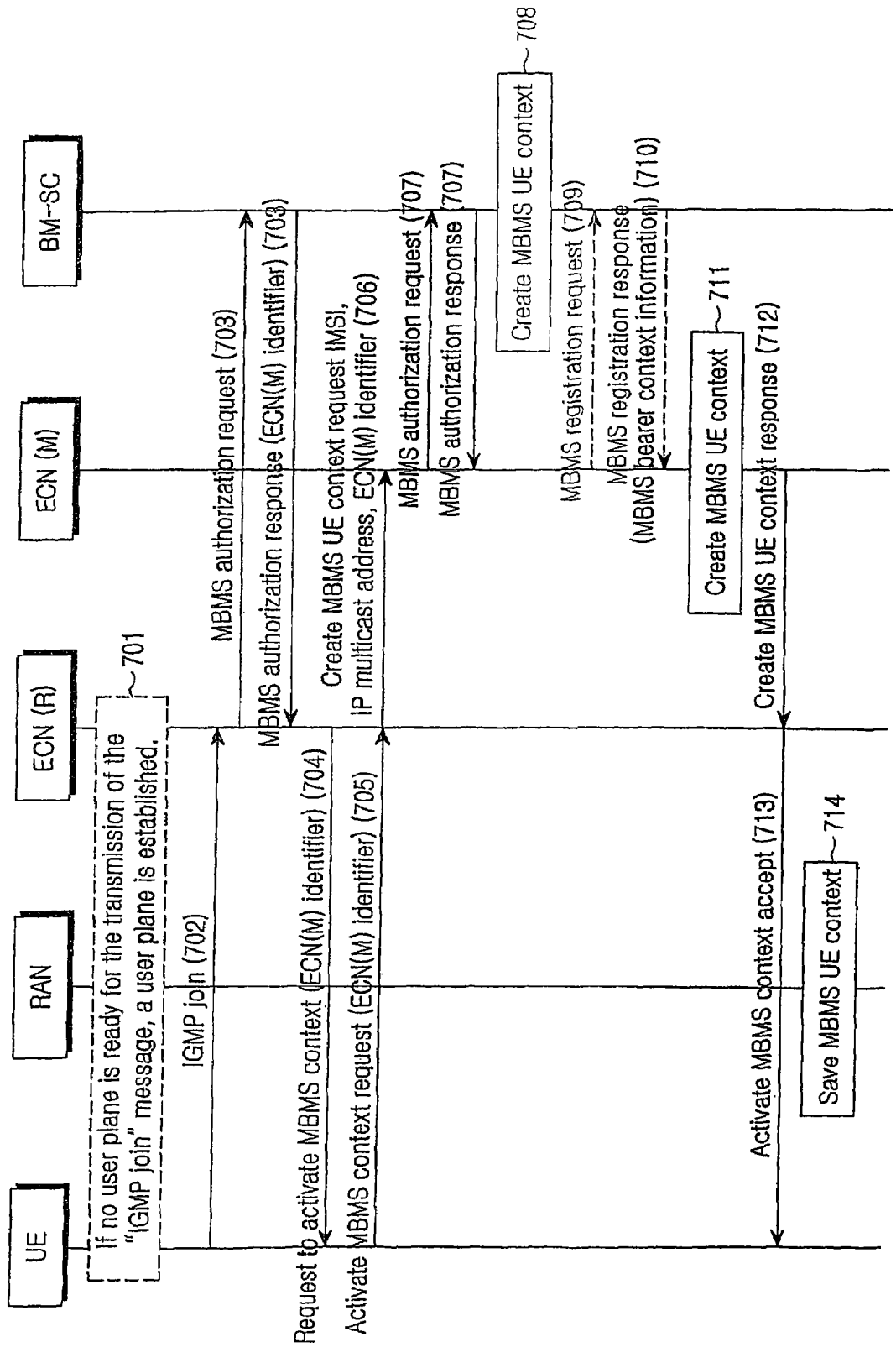
FIG. 7 illustrates a basic process that UE joins in the MBMS service in the MBMS network structure.

In the MBMS network structure, an example of a basic process in which the UE joins in MBMS service is illustrated in FIG. 7. Now, detailed description of the figure is explained herein below.

Referring to FIG. 7, in step 701, if no user plane is ready for the transmission of an "IGMP join" message, a user plane is established. However, present invention does not focus on the process of establishing a user plane, thus corresponding detailed technical description is omitted.

In step 702, the UE sends the "IGMP join" message to the ECN(R) through the existing user plane or the one established in 701. The message includes the parameter such as IP multicast address for indicating certain MBMS multicast service or certain multicast service from external data network.

In step 703, the ECN(R) performs signaling interaction with the BM-SC to authorize the UE. With a "MBMS Authorization Response" message, the BM-SC informs ECN(R) to offer the ECN identifier for MBMS service, i.e., the ECN (M) identifier. It can be indicated with the access point name (hereinafter referred to as APN) or the address (e.g., the IP address) of ECN (M).

In step 704, ECN(R) sends an "Request MBMS Context Activate" message to the UE, the message including information such as the IP multicast address, the ECN (M) identifier, and so on. Two methods have been adopted by the ECN(R) to send the "Request MBMS Context Activate" message to the UE. One way is to directly send a NAS message to UE through ERAN transparently, requesting UE to activate the MBMS context. The other way is to send an Iu+ message to the ERAN, requesting to activate MBMS context. Then the ERAN sends an air-interface message to the UE, requesting to activate the MBMS context.

In step 705, After the UE receives the message mentioned in step 704, it generates the MBMS UE context. The UE sends the "Activate MBMS Context Request" message to the ECN (R), the message including the IP multicast address, the ECN (M) identifier denoted by APN or the address (e.g., the IP address) of ECN(M), the MBMS_NSAPI (the network service access point identifier) and the UE MBMS bearer capability. Two methods have been adopted by the UE to send the "Activate MBMS Context Request" message to the ECN(R). One way is to directly send a NAS message to through ERAN transparently. The other way is to send an air interface message to the ERAN, then the ERAN sends an Iu+ message to the ECN(R), requesting to activate the MBMS context.

In step 706, the ECN(R) sends a "Create MBMS UE Context Request" message to the ECN(M), the message including the IP multicast address, the international mobile set identifier (hereinafter referred to IMSI) and the ECN(M) identifier.

In step 707, the ECN (M) performs signaling interaction with the BM-SC to authorize the MBMS service and the UE after receiving the message in step 706. The decision on authorization is transmitted to ECN (M) with a "MBMS authorization response" message.

In step 708, the BM-SC creates the MBMS UE context.

In step 709, if the ECN (M) has not generated the MBMS bear context information for the service, it sends a "MBMS Registration Request" message to the BM-SC.

In step 710, the BM-SC sends a "MBMS Registration Response" message to the ECN (M), the message including the MBMS bearer context information. The BM-SC adds the identifier for this ECN (M) into the downlink node list of the BM-SC bearer context. If the bearer context has been activated, the BM-SC initiates the session start process with ECN (M).

In step 711, the ECN(M) generates the MBMS UE context and 712 sends the "Create MBMS UE Context Response" message to the ECN(R).

In step 713, the ECN(R) sends an "Activate MBMS Context Accept" message to the UE. Two methods have been adopted by the ECN(R) to send the "Activate MBMS Context Accept" message to the UE. One is to directly send the NAS message Activate MBMS Context Accept to UE through ERAN transparently. The other is to send the Iu+ message Activate MBMS Context Accept to ERAN, then ERAN sends the air-interface message Activate MBMS Context Accept to the UE. For the former method, if at least one user plane has been established for the UE, the ECN(R) sends the "MBMS UE context information" to the ERAN. This process shares the technique with the existing process, so details are omitted here. With the latter method, the ECN(R) includes the MBMS UE context information in the Iu+message Activate the MBMS Context Accept. After the ERAN receives this message, 714 it saves the MBMS UE context. The ERAN sends the "Activate MBMS Context Accept" message to the UE, the message including no MBMS UE context information.

Figure 8:
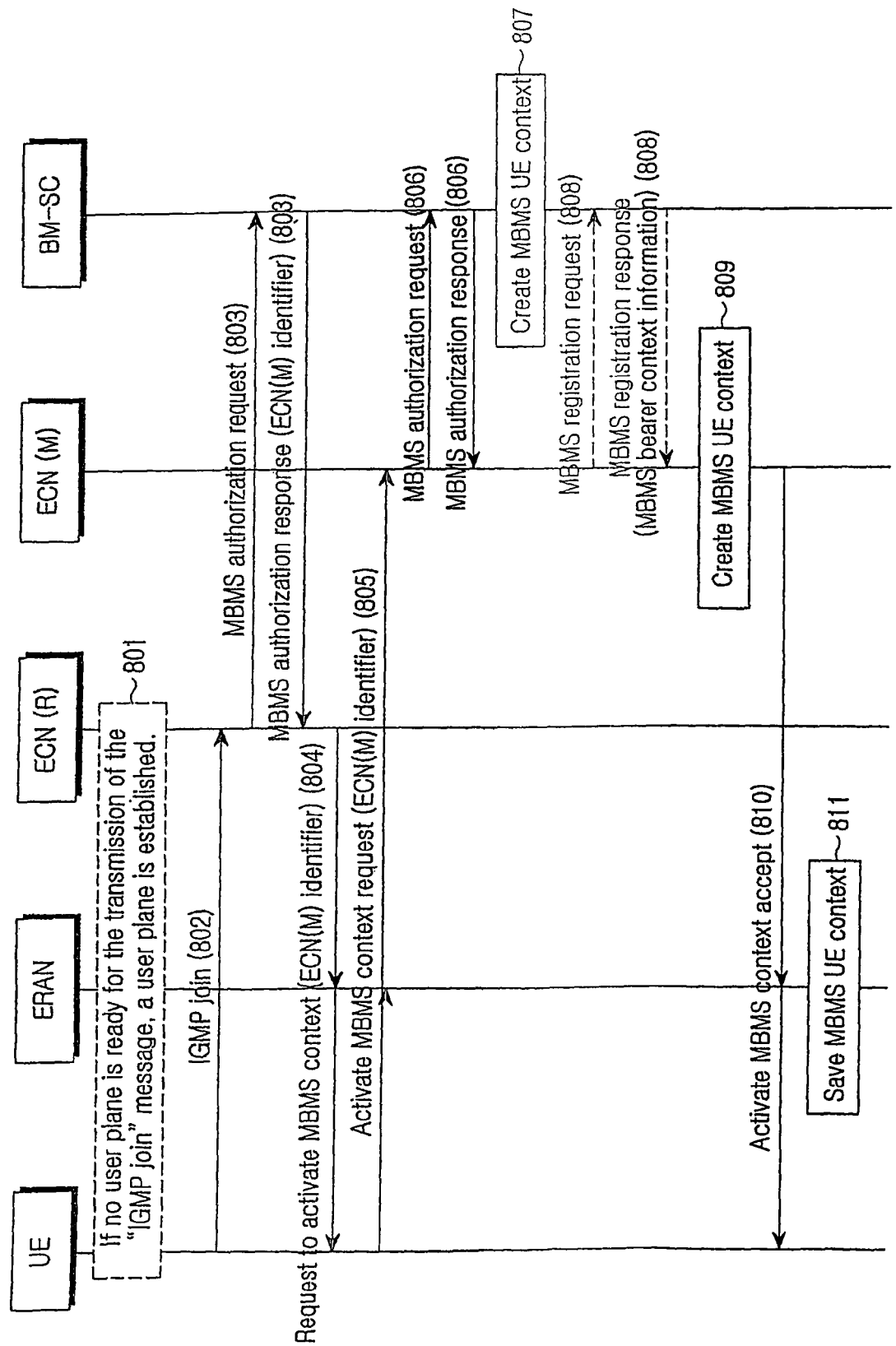
FIG. 8 shows an alternative method that UE joins in MBMS service in the MBMS network structure.

FIG. 8 shows in the MBMS network structure, another method with which the UE joins in MBMS service. Now, detailed description about the drawing is explained.

In step 801, if no user plane is ready for the transmission of the "IGMP join" message, a user plane is established. However, the present invention does not focus on the process of establishing a user plane, so that corresponding detailed technical description is omitted.

In step 802, the UE sends the "IGMP join" message to the ECN(R) through the existing user plane or the one established in 801. The message includes the parameter: IP multicast addresses indicating certain MBMS multicast service or certain multicast service from the external data network.

In step 803, the ECN(R) performs signaling interaction with BM-SC to authorize the UE. With the "MBMS Authorization Response" message, the BM-SC informs ECN(R) to offer the ECN identifier for MBMS service, i.e., the ECN (M) identifier. It can be indicated with the access point name (hereinafter referred to as APN) or the address (e.g., the IP address) of the ECN (M).

In step 804, the ECN(R) sends the "Request MBMS Context Activate" message to the UE, the message including information such as the IP multicast address, the ECN(M) identifier, and so on. Two methods have been adopted by ECN(R) to send the "Request MBMS Context Activate" message to the UE. One is to directly send the NAS message to UE through ERAN transparently, requesting UE to activate the MBMS context. The other is to send the Iu+ message to ERAN, requesting to activate MBMS context. Then the ERAN sends the air-interface message to the UE, requesting to activate the MBMS context.

In step 805, after the UE receives the message mentioned in step 804, it generates the MBMS UE context. The UE sends the "Activate MBMS context request" message to ECN(R), including the IP multicast address, the ECN (M) identifier (which can be denoted by APN or the address (e.g., the IP address) of ECN (M)), the MBMS_NSAPI (the network service access point identifier) and the UE MBMS bearer capability. Two methods have been adopted by the UE to send the "Activate MBMS Context Request" message to the ECN(R). One is to directly send a NAS message to through ERAN transparently. The other is to send an air interface message to the ERAN, then the ERAN sends an Iu+ message to the ECN(R), requesting to activate the MBMS context.

In step 806, the ECN (M) performs signaling interaction with the BM-SC to authorize MBMS service and the UE after receiving the message in step 805. The authorization is transmitted to ECN (M) with the "MBMS Authorization Response" message.

In step 807, the BM-SC creates the MBMS UE Context.

In step 808, if the ECN (M) has not generated the MBMS bearer context, it sends the "MBMS Registration Request" message to the BM-SC. The BM-SC sends the "MBMS Registration Response" message to the ECN (M), the message including the MBMS bearer context information. The BM-SC adds the identifier of this ECN (M) into the downlink node list of the BM-SC bearer context. If the bearer context has been activated, the BM-SC initiates the session start process with ECN (M).

In step 809, the ECN(M) generates the MBMS UE context.

In step 810, the ECN (M) sends the "Activated MBMS Context Accept" to the UE. Two methods have been adopted by the ECN (M) to send the "Activate MBMS Context Accept" message to the UE. One is to directly send the NAS message to the UE through the ERAN transparently, requesting the UE to activate the MBMS Context Accept.

The other is to send the Iu+ message to the ERAN for requesting to activate the MBMS Context Accept. Then the ERAN sends the air-interface message to UE, requesting to activate the MBMS Context Accept. If at least one user plane has been established for the UE with the former method, the ECN (M) sends the "MBMS UE context information" to the ERAN. This process shares the technique with the existing, so that details are omitted here. With the latter method, the ECN (M) includes the MBMS UE context information in the Iu+message "Activating the MBMS Context Accept". After receiving this message, the ERAN implements step 811 to save the MBMS UE context. The ERAN sends the "Activate MBMS Context Accept" message to the UE, including no MBMS UE context information.

Figure 9:
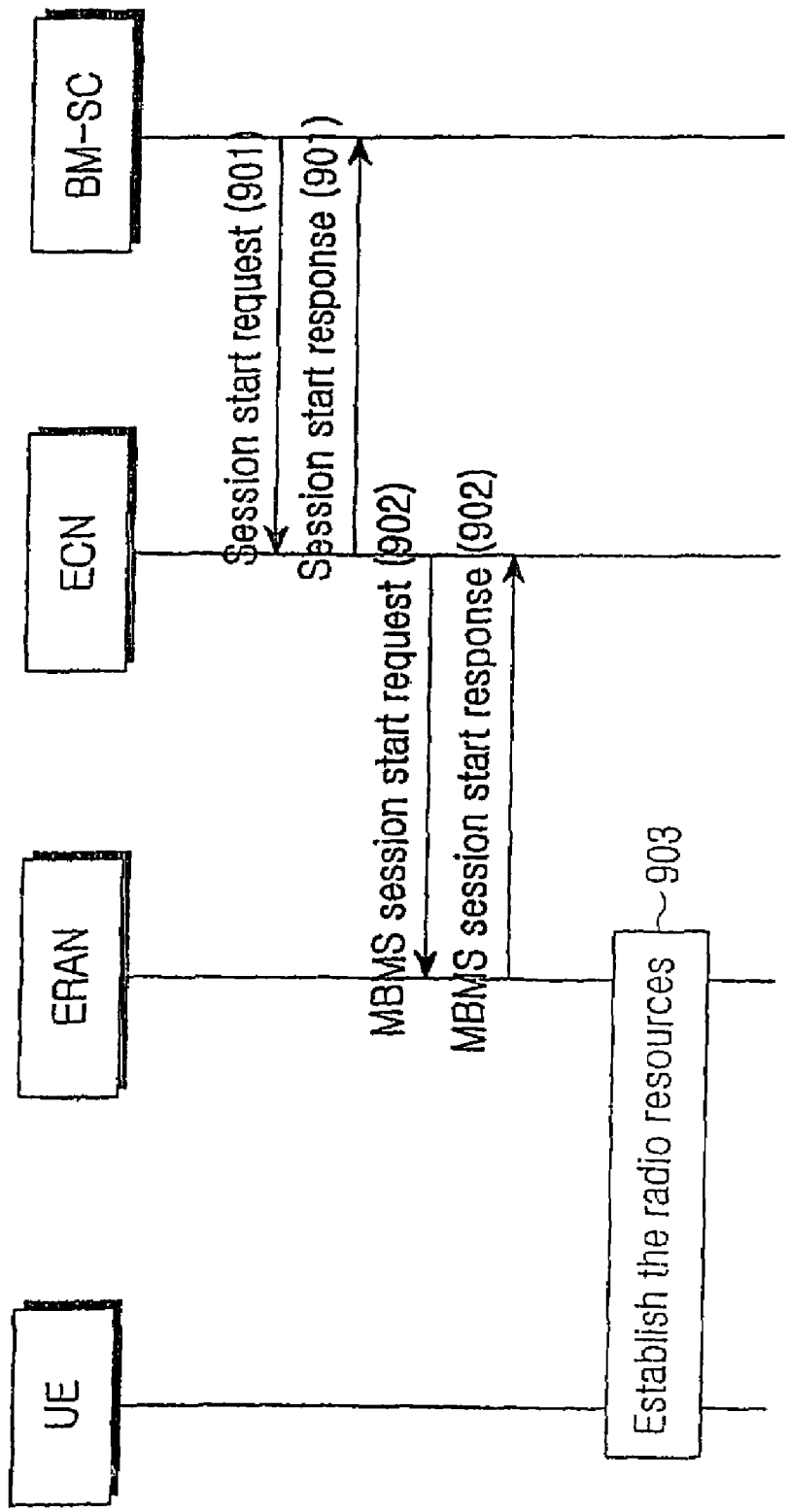
FIG. 9 shows a method for MBMS session starting.

FIG. 9 illustrates a method with which the MBMS service session starts in the MBMS network structure. Now, a detailed description about this figure is explained.

In step 901, the BM-SC sends the "MBMS session start request" message to the ECN (M) in the downstream node list of the MBMS bearer context to indicate the start of the transmission, including attributes for the MBMS session such as the MBMS service identifier, the QoS, the MBMS service area, the session identifier, the estimated time period of the session, broadcast or multicast and so on. In the descriptions shown in FIGS. 7 and 8, the BM-SC has saved the registered downstream node ECN (M) in the MBMS bearer context. The BM-SC sets the state of MBMS bearer context as activated. The ECN (M) creates the MBMS bearer context for the broadcast MBMS service. ECN (M) saves the session attributes and the downstream node list in the MBMS bearer context and sets the bearer context's state as activated. ECN (M) sends a "session start response" message to BM-SC.

In step 902, the ECN (M) sends a "MBMS session start request" message to the interested ERANs. The ECN (M) saves the UE context information indicating the ERAN where UE (which has joined in the MBMS service and stays in the LTE activated mode) locates, and the ERANs within the tracking area where UE (which has joined in the MBMS service but stays in LTE idle mode) locates. The problem that how ECN(M) obtains the context information (e.g., the information on location of the UE) of the UE which has joined in MBMS service will be illustrated with the help of FIG. 10 to FIG. 13. The "MBMS session start request" message includes the session attributes such as the MBMS service identifier, the QoS, the MBMS service area, the session identifier, the estimated time period of the session, broadcast or multicast and so on.

The ERAN creates the MBMS service context for the broadcast MBMS service. ERAN saves the session attributes in the MBMS service context and sets the state of service context as activated. That is how the ERAN generates the MBMS service context shares the same technique with the existing one. For instance, the ERAN receives the message from ECN, informing UE to activate the MBMS service, or receives the "MBMS session start" message from the ECN, and so on. Thus no detailed description will be given here in this regard. The ERAN sends the "MBMS session start response" message to the ECN (M), the message including the user plane identifier of the MBMS service (e.g., the TEID) for transmitting MBMS data by the bearer plane ECN (M). To one MBMS bearer service, if the ERAN receives several "MBMS session start request" messages, it establishes the bearer plane with only one ECN (M).

In step 903, the ERAN establishes necessary radio resources to transmit MBMS data to related UEs.

Figure 10:
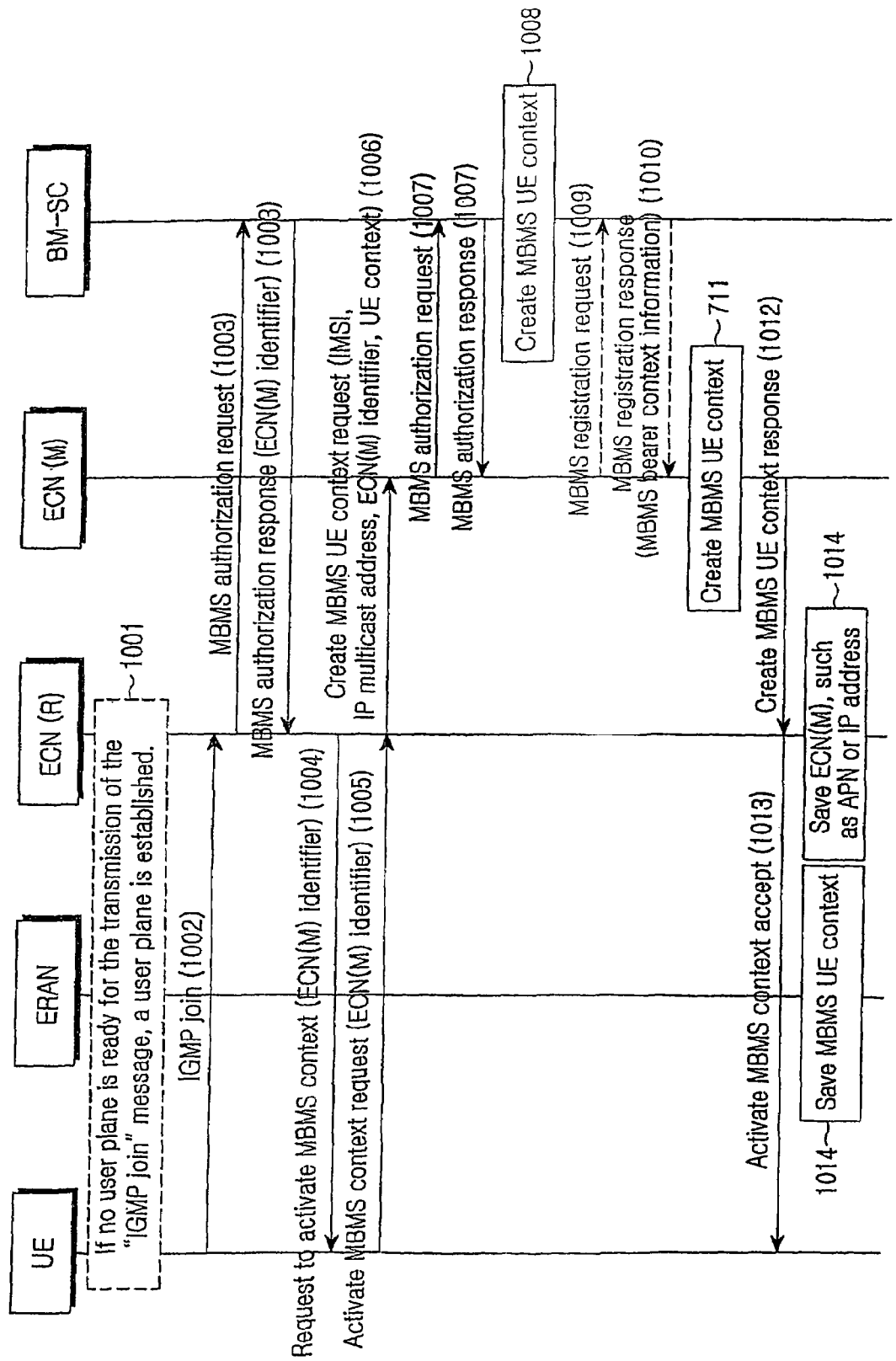
FIG. 10 shows a MBMS data transmission path that supports FIG. 9, and a process that UE joins in MBMS service (method 1)

FIG. 10 describes the process that UE joins in MBMS service (exemplary method 1) in supporting the MBMS data transmission path illustrated in FIG. 9. In the following description, the basic differences from that shown FIG. 7 will be explained in detail herein below.

Compared with the basic process that the UE joins in MBMS service in FIG. 7, referring to FIG. 10, steps 1001 through 1005, and 1007 through 1011 and 1013 through 1014 of this process are consistent with steps 701 through 705, and steps 707 through 711 and 713 through 714 respectively. Accordingly, no additional detail will be given here. The differences are as follows:

In step 1006, after the ECN(R) receives the "Activate MBMS context request" message, it sends an "Create MBMS UE context request" message to ECN (M), including the IP multicast address, the international mobile set identifier (hereinafter referred to as IMSI) and the ECN (M) identifier. In addition, this message also includes the UE context information. The UE context information includes the identifier of the ERAN where the UE locates. After the ECN (M) receives the "Activate MBMS context request" message, it saves the UE context information. Then, it implements step 1007.

In step 1012, the ECN (M) sends the "Create MBMS UE context response" message to ECN(R). After ECN(R) receives this message, it saves the ECN (M) (e.g., the APN or IP address), then step 1013 is implemented.

Figure 11:
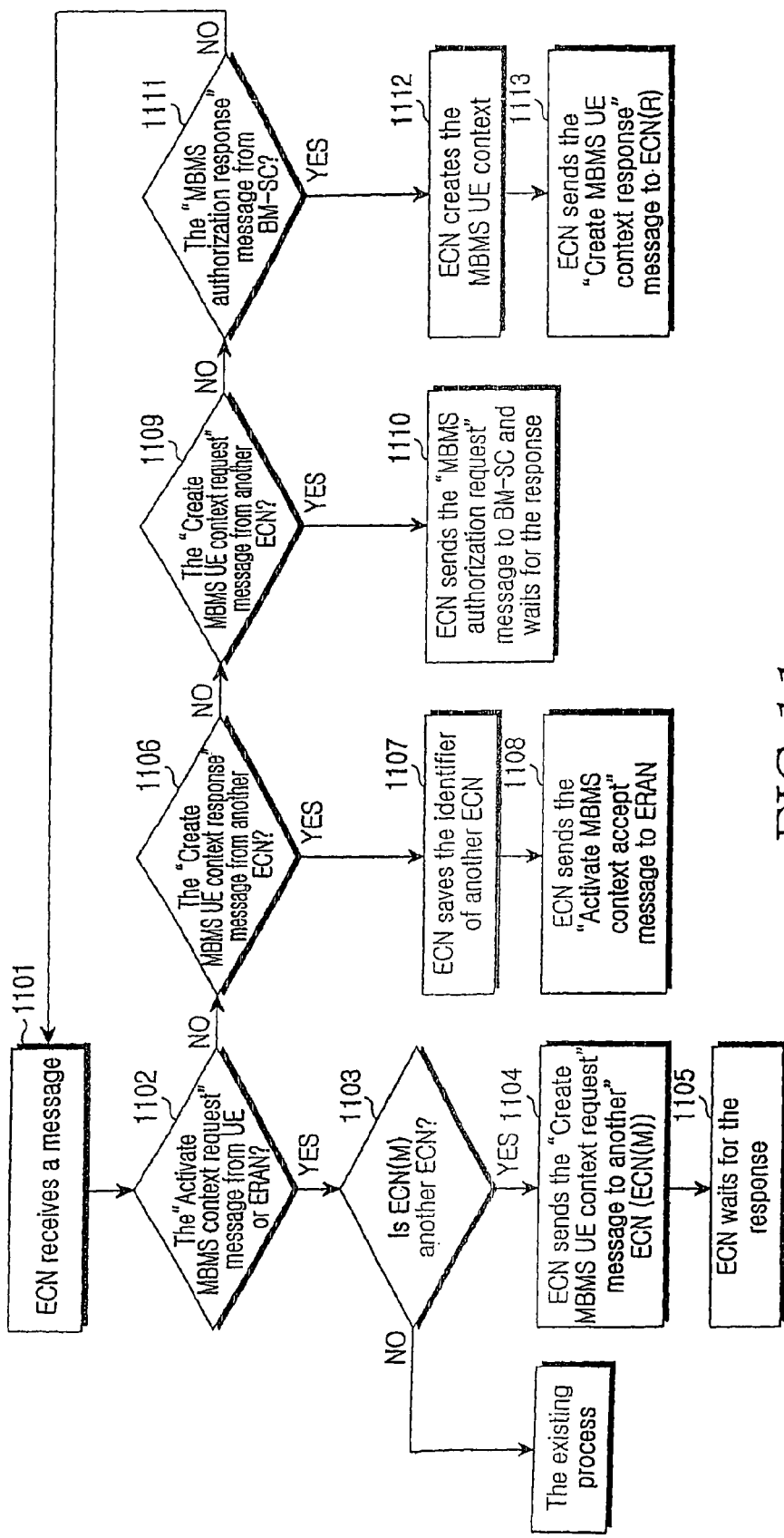
FIG. 11 shows a flow that ECN operates during the process that UE joins in MBMS service (exemplary method 1)

FIG. 11 shows an exemplary operation flow of ECN corresponding to the method with which the UE joins in MBMS service. Here, steps 1102 through 1108 show the operation flow in the case that ECN plays the role of ECN(R). In addition, steps 1109 through 1114 show the operation flow in the case that ECN plays the role of ECN (M). Details description about this Figure is explained.

In step 1101, the ECN receives a message. In step 1102, if the ECN has received the "Activate MBMS context request" message from UE (or ERAN), and in step 1103, if ECN (M) is not another ECN, the existing process is implemented. For example, in this case, the ECN sends the "MBMS authorization request" message to BM-SC and implements the subsequent steps. Here, no additional detailed technical description will be given. If the ECN (M) is just another ECN, in step 1104, it sends the "Create MBMS UE context request" message to the ECN (viz. ECN (M)), including the UE context. Now, the UE stays in activated state. For the UE in activated state, the UE context information includes the ERAN where the UE locates. In step 1105, ECN waits for the response.

In step 1106, if ECN has received the "Create MBMS UE context response" message from another ECN, in step 1107, it saves the identifier of the ECN (viz. the ECN (M)). The identifier of ECN (M) can either be APN or the IP address. In step 1108, the ECN sends the "Activate MBMS Context Accept" message to the ERAN.

In step 1109, if the ECN has received the "Create MBMS UE context request" message from another ECN. In step 1110, it sends the "MBMS authenticate request" message to the BM-SC and waits for the response.

In step 1111, if the ECN has received the "MBMS authenticate response" message from the BM-SC, and according to the authenticate decision in the response message, the ECN terminates the authenticate process if the UE is not permitted to receive this MBMS service. This process is not illustrated in the figure. In step 1112, if the UE is permitted to receive this MBMS service, the ECN creates the MBMS UE context. If the UE is the first one of this ECN (M) to join in the MBMS service (in this case, no MBMS bearer context has been created for the UE by ECN (M) yet), the ECN (M) implements the process of registering in the BM-SC. This process shares the same technique with the existing one. Thus in this figure, no detail is given for the technique. In step 1113, the ECN sends the "Create MBMS UE context response" message to the ECN(R).

Figure 12:
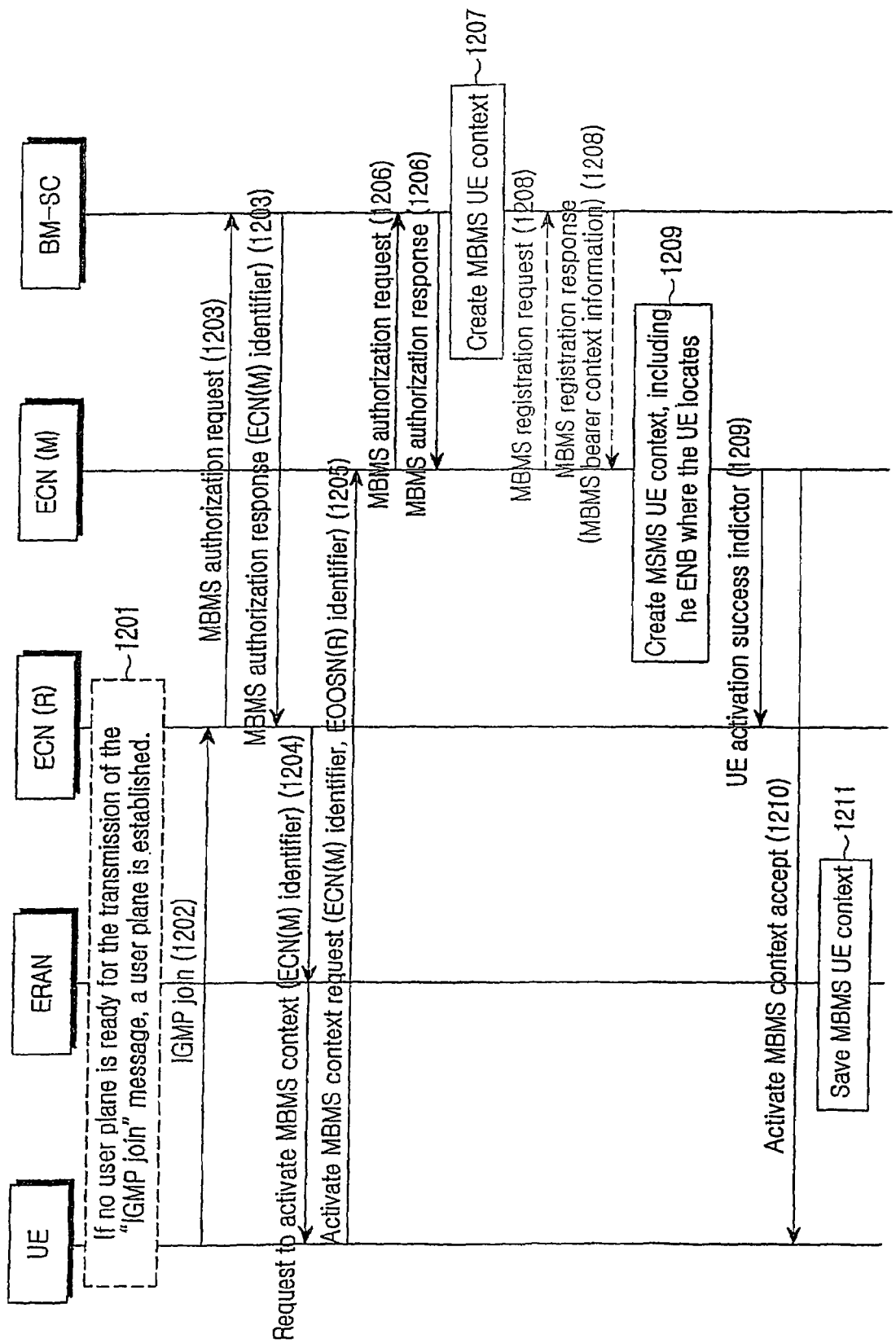
FIG. 12 shows a MBMS data transmission path that supports FIG. 9, and a process that UE joins in MBMS service (exemplary method 2)

FIG. 12 describes the process that the UE joins in MBMS service (method 2) in supporting the MBMS data transmission path illustrated in FIG. 9.

In the following description of FIG. 12, only steps different from those shown in FIG. 8 will be explained in detail.

Compared with the basic process that UE joins in MBMS service in FIG. 8, with regard to FIG. 12, steps 1201 through 1204, and steps 1206 through 1208 and steps 1211 through 1214 of this process are consistent with steps 801 through 804, and steps 806 through 808 and steps 811 through 814 respectively. Thus, no detail will be given here. The differences are as follows:

In step 1205, the UE or ERAN informs the ECN (M) of the UE-registered ECN (i.e., the ECN(R)) via the "Activate MBMS Context Request" message. If this message is the NAS one sent from the UE to the ECN, this means that the UE informs ECN (M) of relevant information directly. If no differentiation exists between the NAS and the AS in the LTE, the UE sends the air interface message to the ERAN. Then, the ERAN sends the Iu+ message to the ECN (M), requesting to activate the MBMS context. This indicates that the ERAN informs ECN (M) of the ECN(R) where the UE locates. Then, step 1206 is implemented.

In step 1209, the ECN (M) creates the "MBMS UE context" and saves the ERAN (where the UE locates) in it. Then, the ECN (M) sends a "UE Activate Success Indicator" message to the ECN(R), including the UE identifier such as IMSI. After the ECN(R) receives the message indicating that UE succeeds in activating MBMS context in step 1209, it saves the ECN (M) in the UE context. Then step 1210 is performed.

Figure 13:
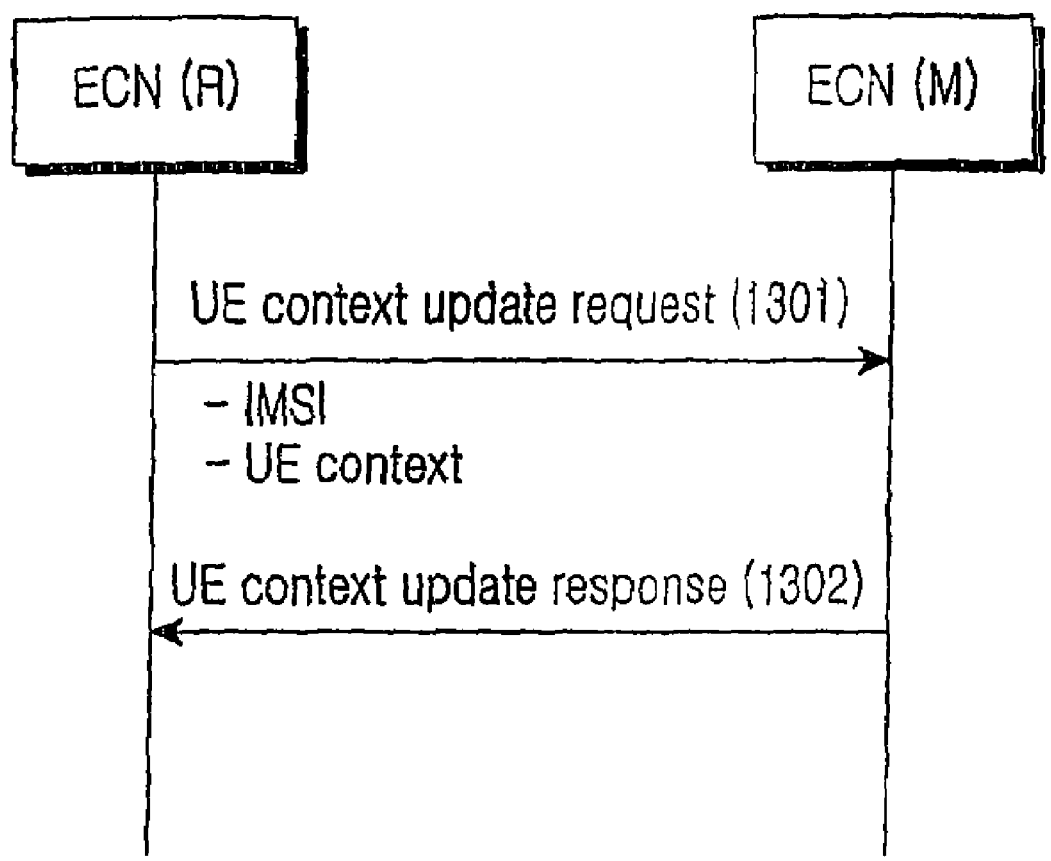
FIG. 13 shows a signaling flow that UE accesses the system which has no RMA network node.

When the location information of the UE is changed, the ECN(R) will inform the ECN (M) of related information. For instance, when the ERAN where the UE locates changes, or the UE switches from the LTE activated state into idle (the location information of UE changes from a certain ERAN to several ERANs of a certain tracking area (hereinafter referred to as TA)), or the UE switches from LTE idle mode into activated mode, it is necessary to inform the ECN(M) of the related information. This process is illustrated in FIG. 13. Now, detailed descriptions about this process will be given.

In step 1301, the ECN(R) sends a "UE context update request" message to the ECN (M), the message including the UE identifier (e.g., IMSI) and the UE context information. The UE context information includes the ERAN where UE locates, the TA where UE locates, and the list of ERANs within the TA. After the ECN (M) receives this message, it updates the UE context information. In step 1302, the ECN (M) sends the "UE context update response" message to the ECN(R).

Figure 14:
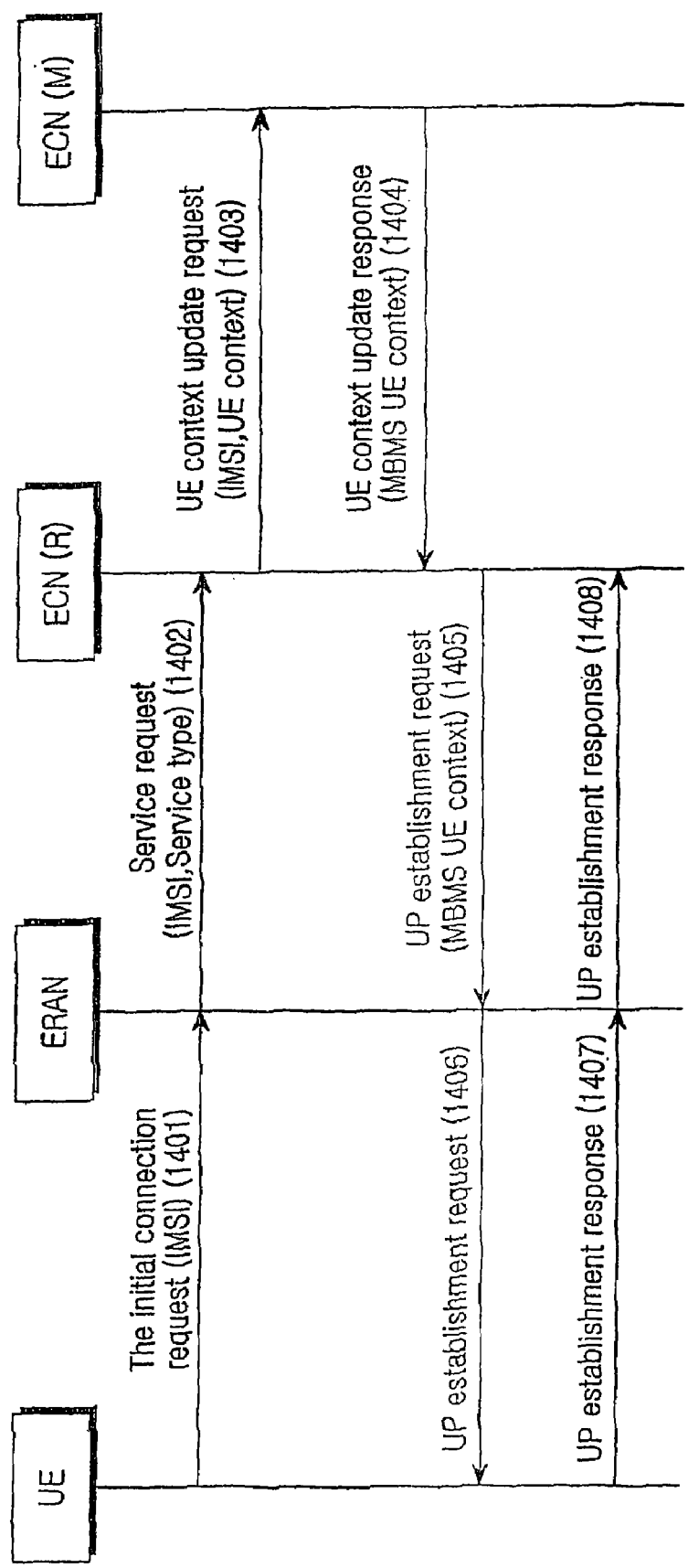
FIG. 14 shows a process that MBMS service joined UE switches from LTE idle mode to activated mode.

FIG. 14 shows an exemplary process in which the UE (which has joined in MBMS service) switches from the LTE idle mode into the activated one. Detailed descriptions on this process are given below.

In step 1401, the UE sends an "Initial connection request" message to the ERAN, including parameters such as the UE identifier (e.g., IMSI), radio access capacity of the UE and so on. After ERAN receives this message, in step 1402, it sends the "Service Request" message to the ECN(R), including parameters such as the UE identifier, the service type and so on.

Because of the change in state of the UE, the UE location information on ECN changes from several ERANs within a TA into one ERAN. In step 1403, the ECN(R) sends the "UE context update request" message to ECN (M). This message includes the UE identifier (e.g., IMSI) and UE context. In this case, the UE context information indicates the ERAN where UE locates. After ECN (M) receives the UE context update request message, it updates the UE context information. In step 1404, the ECN (M) sends the "UE context update response" message to ECN(R), including MBMS UE context information. MBMS context information refers to the list of the identifier of the MBMS that UE has joined in.

In step 1405, the ECN(R) sends the user plane (hereinafter referred to as UP) establishment message to the ERAN, including parameters necessary for the establishment of user plane such as the UP identifier, Qos and so on, and the MBMS UE context. Here, no sequence order exists between that ECN sends the UP establishment request message and the steps 1403 and 1404.

After the ERAN receives the "UP establishment request" message, it saves the MBMS UE context. In step 1406, the ERAN sends the "UP establishment request" message to the UE.

In step 1407, the UE configures the resource according to the "UP establishment request" message, then it sends the "UP establishment response" message to the ERAN. 1408 ERAN sends the "UP establishment response" message to ECN(R).

Here, the step 1405 of establishing Iu+ interface is not only suitable for supporting the MBMS data transmission in FIG. 9, but also suitable for any other ones. It has nothing to do with the MBMS data transmission path. The UP establishing process for the Iu+ interface is also used for the transmission of MBMS UE context information to ERAN.

Figure 15:
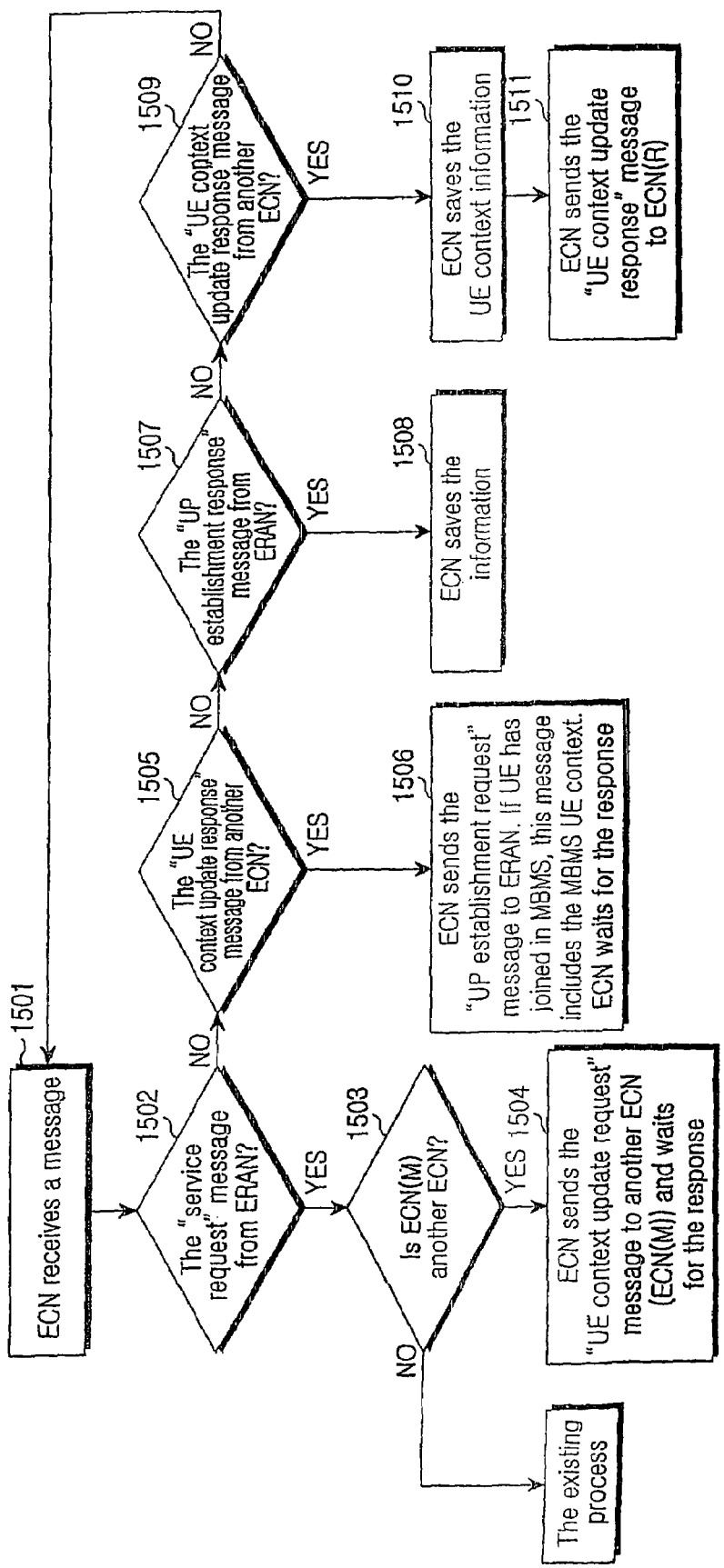
FIG. 15 shows an operation flow of ECN corresponding to an exemplary embodiment in FIG. 14.

The exemplary embodiment corresponding to the processes that the UE context between ECN(R) and ECN(M) updates, and that ECN sends the MBMS UE context to ERAN via the "UP establishment request" message, is illustrated in FIG. 14. The operation flow for ECN is illustrated in FIG. 15. Detailed descriptions on this process are given below.

In step 1501, the ECN receives a message, in step 1502, the ECN has received the service request message from the ERAN. In step 1503, if the ECN(M) is another different ECN, in step 1504, ECN sends the "UE context update request" message to the ECN(M) and waits for the response. Here, detail is omitted for the case that ECN (M) and ECN(R) are just the same ECN. In fact, in the description in FIG. 13, if location information of the UE changes, it is necessary for the ECN(R) to send the "UE context update request" message to the ECN(M). For instance, if the ERAN where the UE locates changes, or if the ERAN where UE locates changes, or UE switches from LTE activated state into idle (the location information of the UE changes from a certain ERAN to several ERANs of a certain tracking area (hereinafter referred to as TA)), or the UE switches from LTE idle mode into activated one, it is necessary to inform ECN (M) of the related information. In the following, the case that UE switches from LTE idle mode into activated one is taken as the example to describe operations of the ECN.

In step 1505, if ECN has received the "UE context update response" message from another ECN, in step 1506, it sends the "UP establishment request" message to the ERAN. If the UE has joined in the MBMS service, this message includes the MBMS UE context information (including the list of identifier of the MBMS service that UE has joined in). Next, ECN waits for the response. As described above, the UE context information between the ECN(R) and the ECN (M) updates in many cases. In other cases, the ECN may not implement, in step 1506, after it receives the "UE context update response" message. Here, the description is focus on the case that UE switches from LTE idle mode into activated one.

In step 1507, if the ECN has received the "UP establishment response" message from the ERAN, 1508 it saves information such as the ERAN allocated user plane identifier.

In step 1509, if the ECN has received the "UE context update request" message from another ECN, in step 1510, it updates the UE context information such as the ERAN where the UE locates. In step 1511, the ECN sends the "UE context update response" message to the ECN (i.e., the ECN(R)) that sends the relevant message.

Here, steps 1502 through 1508 show an example of operation flow in the case where the ECN plays the role of ECN(R) and steps 1509 through 1511 show the operation flow in the case that ECN plays the role of ECN (M).

FIG. 14 illustrates the exemplary embodiment corresponding to the processes that the UE context between ECN(R) and ECN(M) updates, and that ECN sends the MBMS UE context to ERAN via the "UP establishment request" message.

Figure 16:
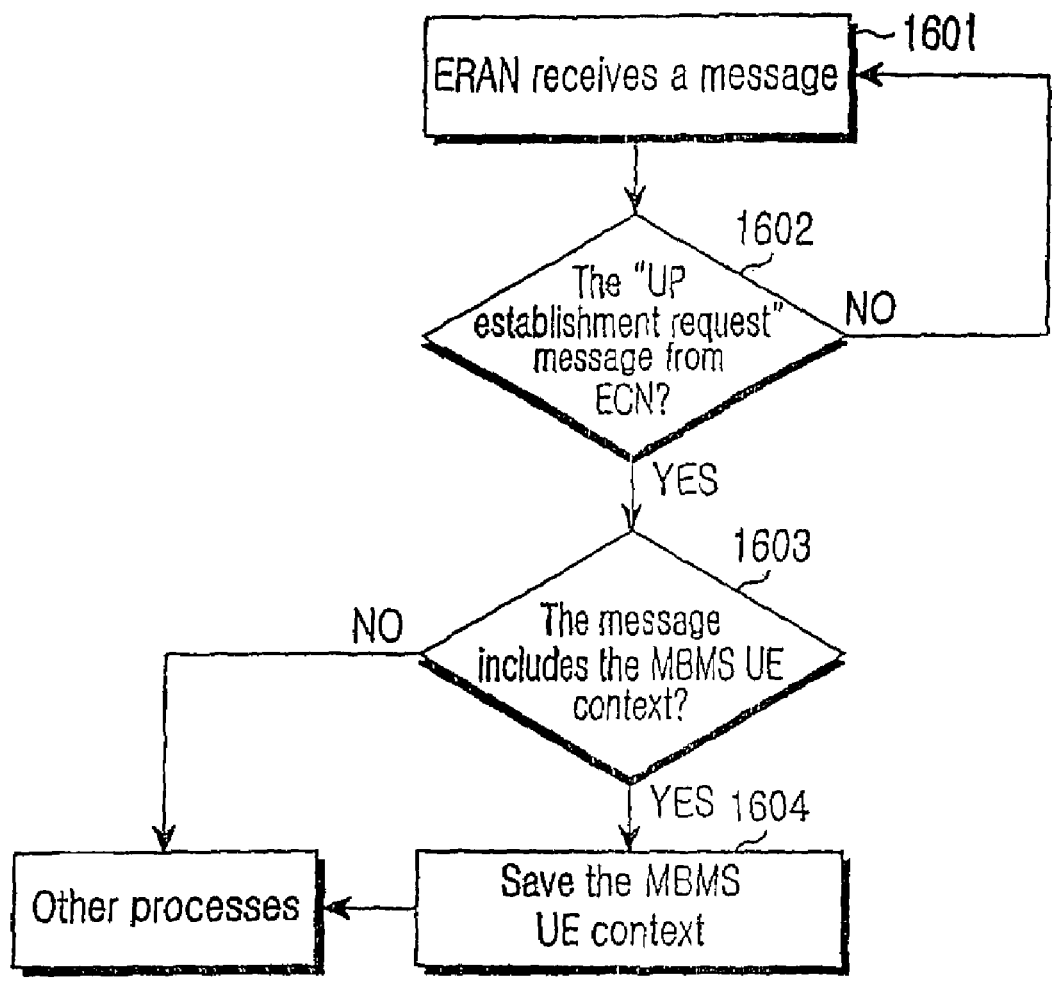
FIG. 16 shows an operation flow of ERAN corresponding to an exemplary embodiment in FIG. 14.

FIG. 16 illustrates an example of the operation flow of the ERAN. Detailed descriptions on this process are given below.

In step 1601, the ERAN receives a message, and in step 1602, the ERAN has received the "UP establishment request" message from the ECN. In step 1603, if the "UP establishment request" message includes the MBMS UE context information, in step 1604, ERAN saves the MBMS UE context information. Then, the ERAN implements subsequent steps, such as sending "UP establishment request" message to the UE. As this is not the focus of present invention, no additional details will be given here. If no MBMS UE context information is included in the message, ERAN also implements other processes that have nothing to do with MBMS.

Figure 17:
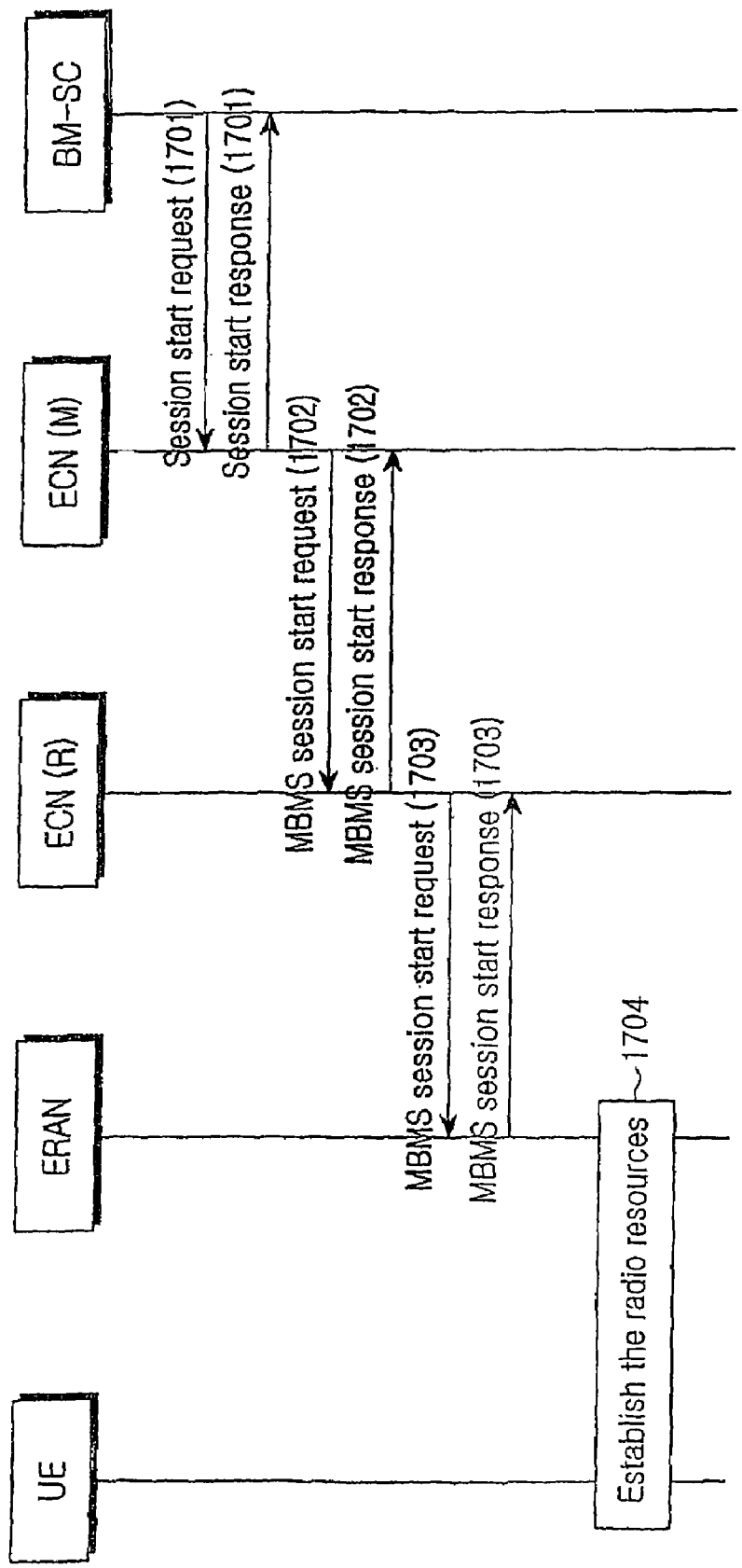
FIG. 17 shows a second exemplary method on MBMS session starting.

FIG. 17 illustrates the second method with which the MBMS service session starts in the MBMS network architecture. Now, a detailed description on this figure will be given herein below.

In step 1701, the BM-SC sends the "MBMS session start request" message to the ECN (M) in the downstream node list of the MBMS bearer context to indicate the start of the transmission, including attributes of the MBMS session such as the MBMS service identifier, the QoS, the MBMS service area, the session identifier, the estimated time period of the session, broadcast or multicast and so on. In the descriptions illustrated in FIGS. 7 and 8, the BM-SC has saved the registered downstream node ECN (M) in the MBMS bearer context. The BM-SC sets the state of MBMS bearer context as activated. The ECN (M) creates the MBMS bearer context for the broadcast MBMS service. The ECN (M) saves the session attributes and the downstream node list in the MBMS bearer context and sets the state of bearer context as activated. The ECN (M) sends the "session start response" message to the BM-SC.

In step 1702, the ECN (M) sends the "MBMS session start request" message to the ECN(R) in the downstream node list of the MBMS bearer context. The problem how the ECN(M) obtains the information on the ECN(R) where UE (which has joined in MBMS service) locates will be illustrated with the help of FIG. 18 to FIG. 21. This message includes the session attributes such as the MBMS service identifier, the QoS, the MBMS service area, the session identifier, the estimated time period of the session, broadcast or multicast and so on. The ECN(R) creates the MBMS service context for the broadcast MBMS service. The ECN(R) saves the session attributes in the MBMS service context and sets the state of service context as activated. The ECN(R) sends the "MBMS session start response" message to the ECN (M), including user plane identifier of the MBMS service (e.g., the TEID) for transmitting the MBMS data by the bearer plane ECN (M). To one MBMS bearer service, if the ECN(R) receives several "MBMS session start request" messages, it establishes the bearer plane with only one ECN (M).

In step 1703, the ECN(R) sends the "MBMS session start request" message to related ERANs. Two methods have been adopted by ECN(R) to find related ERANs. One is that ECN (R) saves the MBMS UE context when the UE joins in MBMS service. For details, the description on FIG. 18 will be referred to. The MBMS UE context includes the UE identifier, the list of the identifier of the MBMS that the UE has joined in, and the list of ECN (M). The ERAN where UE (has joined in MBMS service) locates, or the ERANs within the TA where UE (has joined in MBMS service) locates, is/are the related one(s). The second method is that the UE identifier list is included in the "MBMS session start request" message sent from the ECN (M) to the ECN(R). The ECN(R) locates the related ERANs according to the UE which has joined in MBMS service. The "MBMS session start request" message includes the session attributes such as the TMGI, the QoS, the MBMS service area, the session identifier, the estimated time period of the session, broadcast or multicast and so on. For the broadcast MBMS bearer service, the ERAN creates the MBMS bearer context. The ERAN saves the session attributes in the MBMS service context and sets the state of the service context as activated. The ERAN sends the "MBMS session start response" message to ECN(R), including the user plane identifier of the MBMS service (e.g., the TEID) for transmitting the MBMS data to the ERAN by the bearer plane ECN(R). To one MBMS bearer service, if ERAN receives several "MBMS session start request" messages, it establishes the bearer plane with only one ECN(R).

In step 1704, the ERAN establishes necessary radio resources to transmit MBMS data to related UEs.

Figure 18:
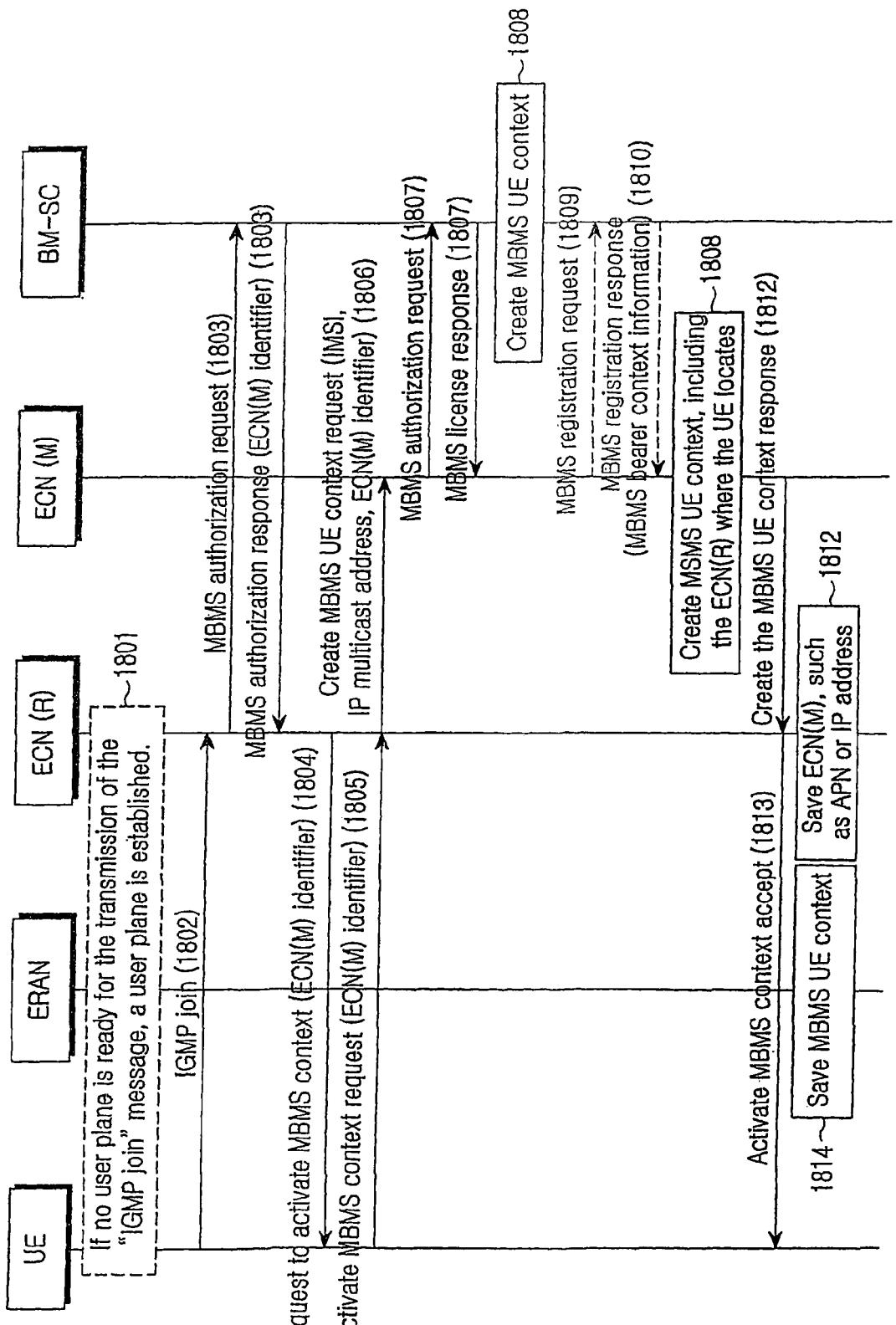
FIG. 18 shows a MBMS data transmission path that supports FIG. 17, and a process that UE joins in MBMS service (exemplary method 1)

Supporting the MBMS data transmission path illustrated in FIG. 17, FIG. 18 describes the process that the UE joins in MBMS service (method 1). In the following, only those items different from that in FIG. 7 will be explained in additional detail.

Compared with the basic process that UE joins in MBMS service in FIG. 7, steps 1801 through 1810, and steps 1813 through 1814 of this process are consistent with steps 701 through 710, and steps 713 through 714 respectively. Thus no detail will be given here. The differences are as follows:

In step 1811, the ECN (M) creates the MBMS UE context, including the ECN(R) where the UE locates in.

In step 1812, the ECN (M) sends the "Create MBMS UE context response" message to the ECN(R). For the method in step 1703 that ECN(R) saves the MBMS UE context, if the MBMS service is the first one that the UE joins in, the ECN (R) creates the MBMS UE context and saves the UE identifier, the MBMS service identifier and the ECN (M) identifier (can be either the APN or the IP address). Otherwise, the ECN(R) updates the MBMS UE context and saves the MBMS service identifier and ECN (M) identifier respectively in the MBMS service identifier list and the ECN (M) identifier list. To the method in step 1703 that the ECN(M) includes the UE identifier list in the "MBMS session start request" message sent from the ECN(M) to the ECN(R), it is necessary for the ECN(R) to save the identifier of ECN(M).

Figure 19:
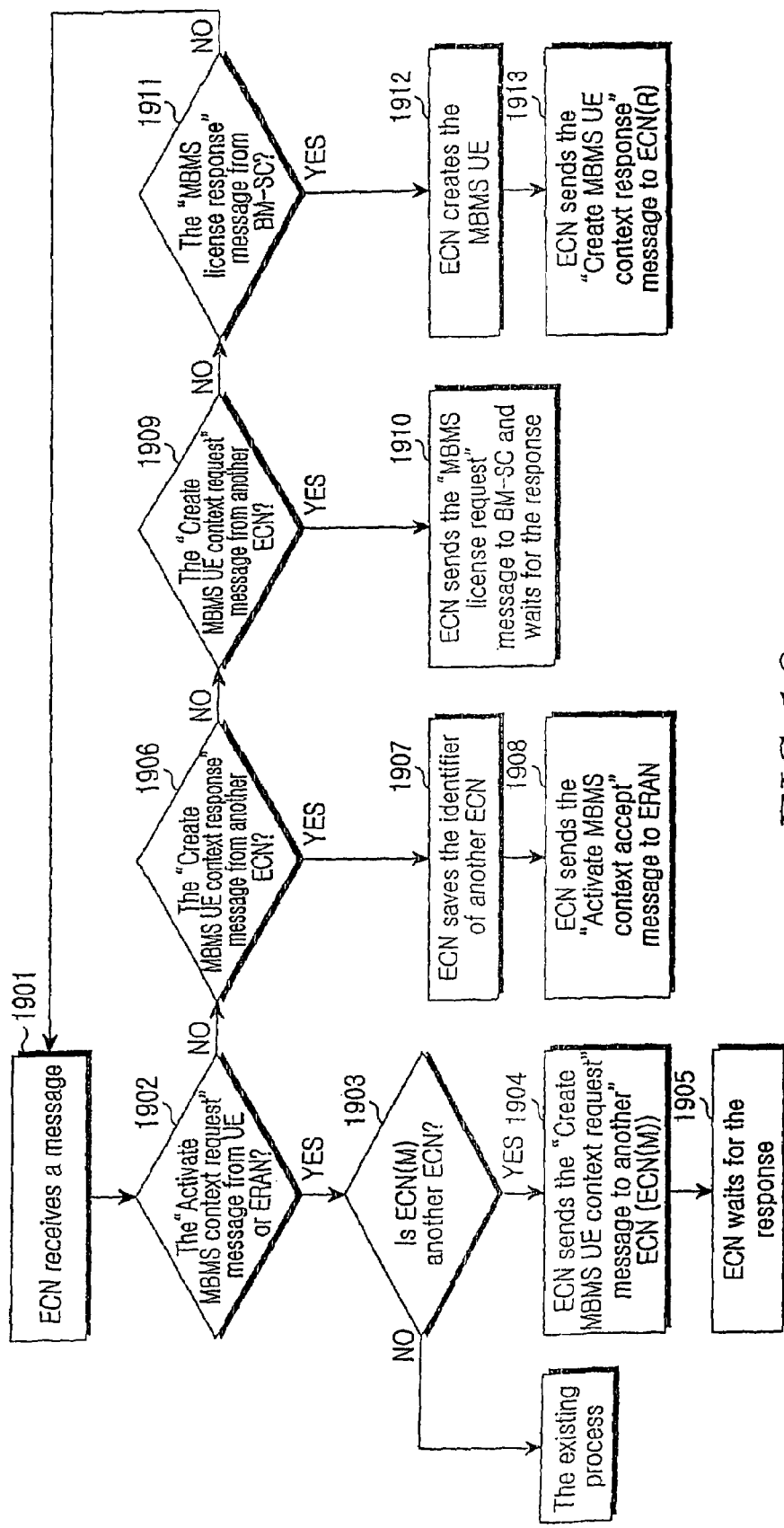
FIG. 19 shows a flow that ECN operates during the process that UE joins in MBMS service (exemplary method 1) corresponding to FIG. 18.

FIG. 19 illustrates the exemplary operation flow for the ECN in the method that the UE joins in MBMS service. Now, the steps 1904, 1907 and 1912 that differ from those in FIG. 11 are considered. No detail will be given to all other steps that are similar to those in FIG. 11.

In step 1904, the ECN sends the "Create MBMS UE context request" to another ECN (viz. ECN (M)). Then, it implements step 1905 and waits for the response.

In step 1907, to the method in step 1703 that ECN(R) saves the MBMS UE context. If the MBMS service is the first one that the UE joins in, the ECN(R) creates the MBMS UE context and saves the UE identifier, the MBMS service identifier and the ECN (M) identifier (can be either the APN or the IP address). Otherwise, the ECN(R) updates the MBMS UE context and saves the MBMS service identifier and the ECN (M) identifier respectively in the MBMS service identifier list and the ECN (M) identifier list. For the method in step 1703 that the ECN(M) includes the UE identifier list in the "MBMS session start request" message sent from the ECN(M) to the ECN(R), it is necessary for ECN(R) to save the identifier of the ECN(M).

In step 1912, if the UE is authorized to join in MBMS service, the ECN creates the MBMS UE context, including the UE-registered ECN (i.e., the ECN(R)). If the UE is the first one of this ECN (M) to join in the MBMS service, the ECN (M) is necessary to implement the process of registering in the BM-SC. This process shares the same technique with the existing one. Thus in this figure, no detail is given for the technique.

Figure 20:
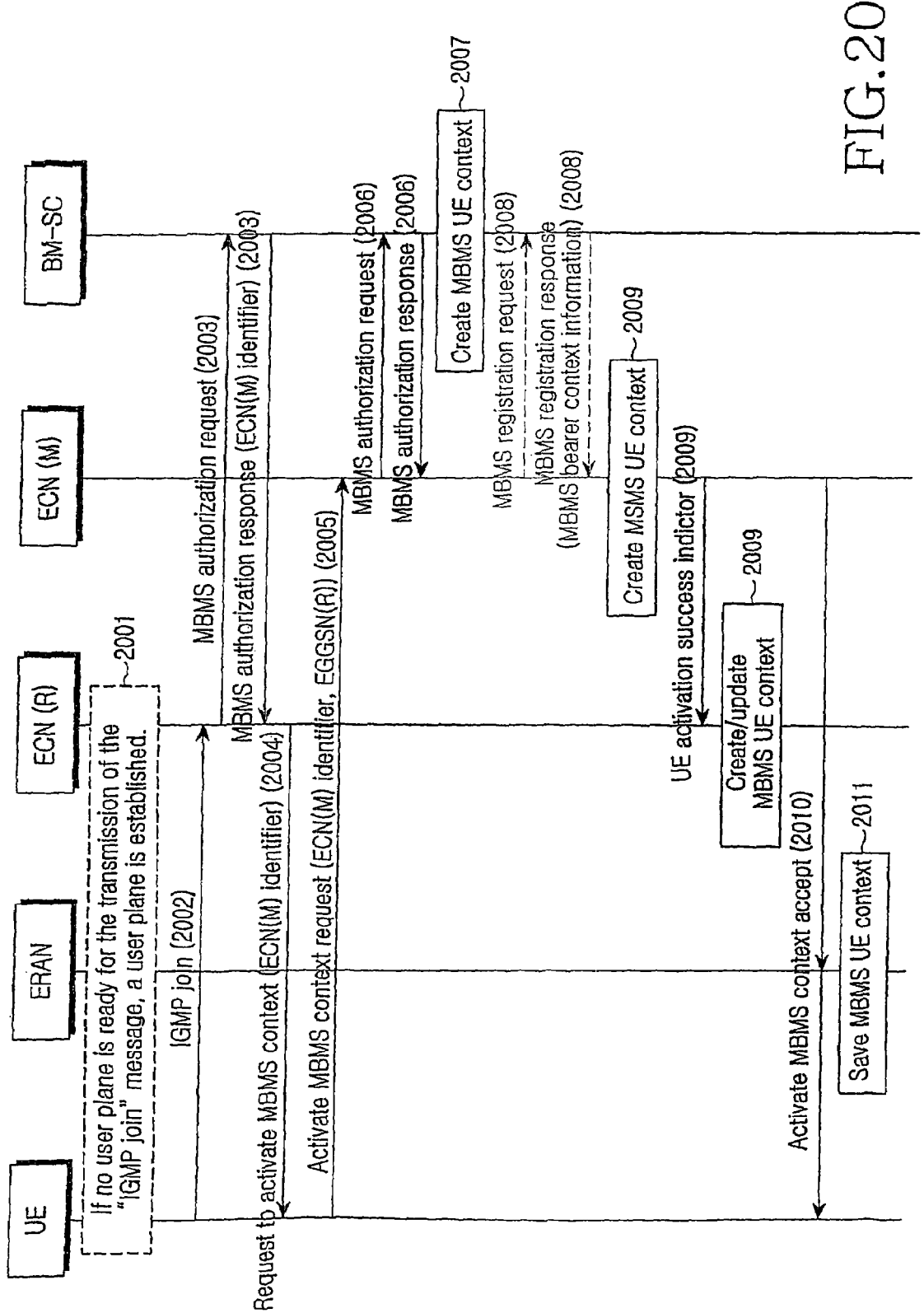
FIG. 20 shows a MBMS data transmission path that supports FIG. 17, and a process that UE joins in MBMS service (exemplary method 2)

Supporting the MBMS data transmission path illustrated in FIG. 17, FIG. 20 describes the process that UE joins in MBMS service (method 2). In the following, only those different from that in FIG. 8 will be explained in detail.

Compared with the basic process that the UE joins in MBMS service in FIG. 8, in FIG. 20, steps 2001 through 2004, steps 2006 through 2008 and steps 2011 through 2014 of this process are consistent with steps 801 through 804, steps 806 through 808 and steps 811 through 814 respectively. Thus no detail will be given here. The differences are as follows:

In step 2005, the UE or the ERAN informs the ECN (M) of the UE-registered ECN (i.e., the ECN(R)) via the "Activate MBMS context request" message. If this message is the NAS one sent from the UE to the ECN, this means that the UE informs ECN (M) of relevant information directly. If no differentiation exists between the NAS and the AS in LTE, the UE sends the air interface message to the ERAN. Then, the ERAN sends the Iu+ message to the ECN (M), requesting to activate the MBMS context. This indicates that ERAN informs ECN (M) of the ECN(R) where the UE locates in. Then, step 2006 is performed.

In step 2009, the ECN (M) creates the "MBMS UE context" and saves the ECN(R) (where the UE locates) in it. Then, the ECN (M) sends the "UE succeeds in activating MBMS context" message to the ECN(R), the message including the UE identifier such as IMSI. After the ECN(R) receives the message indicating that UE succeeds in activating MBMS context in step 2009, it saves the ECN (M) in the UE context with the method described in step 1703. If the MBMS service is the first one that the UE joins in, the ECN(R) creates the MBMS UE context and saves the UE identifier, the MBMS service identifier and the ECN (M) identifier (can be either the APN or the IP address). Otherwise, the ECN(R) updates the MBMS UE context and saves the MBMS service identifier and ECN (M) identifier respectively in the MBMS service identifier list and the ECN (M) identifier list. For the method in step 1703 that ECN (M) includes UE identifier list in the "MBMS session start request" message sent from the ECN (M) to the ECN(R), it is necessary for the ECN(R) to save the identifier of ECN (M). Step 2010 is performed.

In the case that the data transmission path illustrated in FIG. 17 is supported, if the UE stays in LTE idle mode and the ECN(R) where the UE locates changes, it is necessary to inform the ECN (M) of the relevant information. This process is illustrated in FIG. 21.

Figure 21:
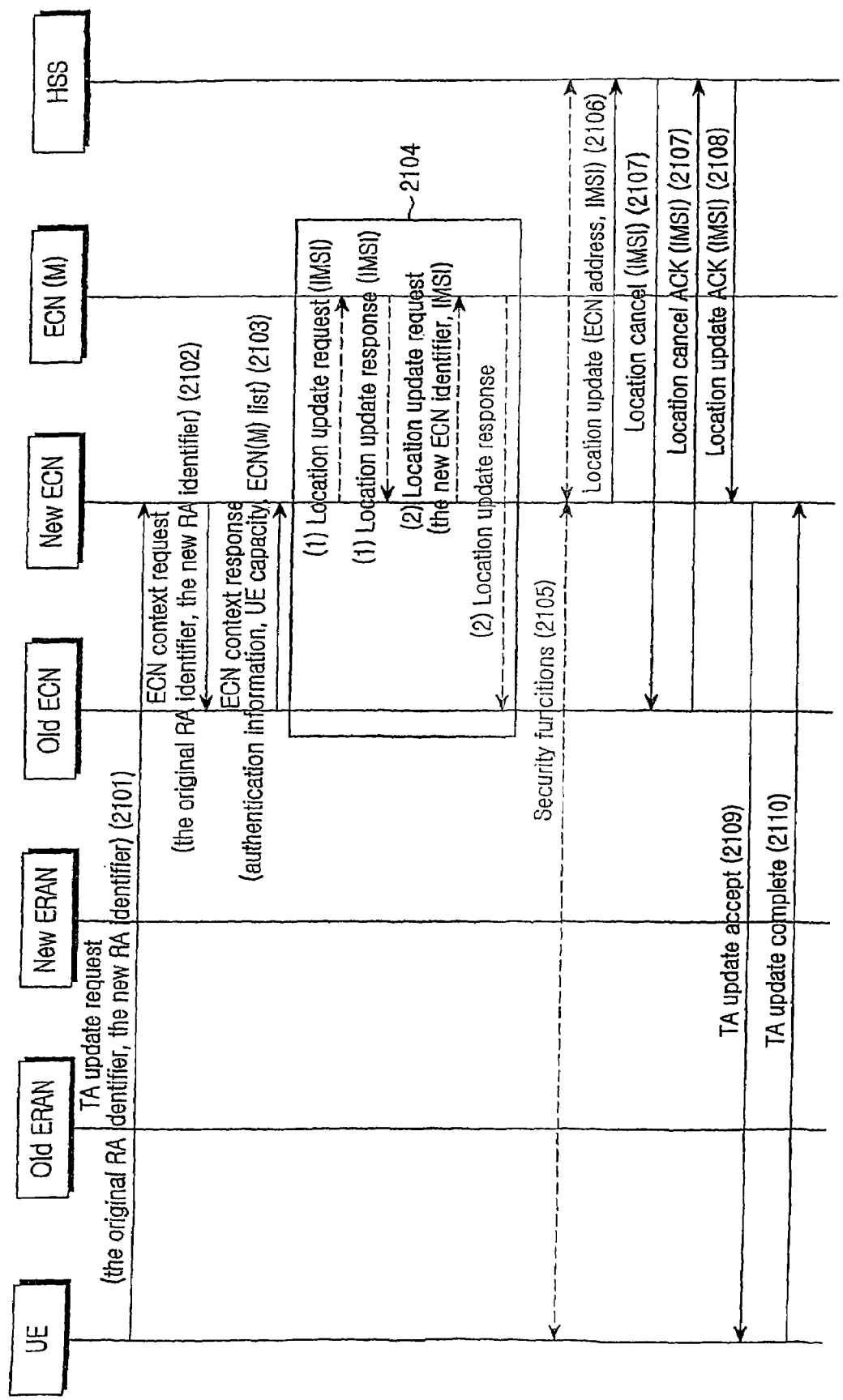
FIG. 21 shows a process that ECN(R) (which UE locates in) changes when the UE stays in LTE idle mode.

With reference to FIG. 21, in step 2101, when the UE (which stays in LTE idle mode) switches from one TA into another TA, it is necessary for it to send a "TA update request" message to the new ECN, the message including an identifier for the original TA and an identifier of the new TA. After the ECN receives this message, it finds out that the UE is already in another ECN according to the identifier of the original TA. In step 2102, the ECN sends the "ECN context update request" message to the original ECN, including the original TA's identifier and the new TA's identifier. In step 2103, after the original ECN receives the "ECN context request" message, it sends the "ECN context response" message to the new ECN. With this message, the UE context information (such as the authentication info, UE capability and so on) is transferred to the new ECN. This message also includes the ECN (M) list of the MBMS that the UE has joined in.

Step 2104 illustrates the process that ECN (M) is informed of the changes of the UE-registered ECN(R). Two methods are adopted to inform ECN (M) of relevant information. (1) The new ECN(R) sends the "Location update request" message to ECN (M), including the UE identifier such as IMSI. After ECN (M) receives this message, it updates the ECN(R) where the UE locates, and sends the "Location update response" message to the new ECN(R), including the UE identifier such as IMSI. (2) The original ECN(R) sends the "Location update request" message to ECN (M), including the new ECN identifier, the UE identifier such as IMSI. After the ECN (M) receives this message, it updates the ECN(R) where the UE locates, and sends the "Location update response" message to the original ECN(R), including the UE identifier such as IMSI. In the second method, the process of requesting to update location may be implemented before the process of ECN context request and response between the new and the original ECNs. In these two methods, no response message may be allowed during the process of location updating.

In step 2105, if necessary, the security process between the UE and the network is implemented.

In step 2106, the new ECN sends a "Location update" message to a Home Subscriber Server (hereinafter referred to as HSS), requesting HSS to update location information of the UE. In step 2107, After the HSS receives this message, it sends a "Location cancel" message to the original ECN, requesting it to delete UE-related information. The original ECN deletes UE-related information and sends the "Location cancel ACK" message to the HSS. After the HSS receives the "Location cancel ACK" message from the original ECN, in step 2108 it sends the "Location update ACK" message to the new ECN.

After the new ECN receives the "Location update ACK" message, in step 2109, it sends the "TA update complete" message to UE. In step 2110, the UE updates relevant information and sends the "TA update complete" message to the new ECN.

Here, messages in steps 2101, 2109 and 2110 may be NAS transmitted through the ERAN. Or they may be the two messages transmitted through the air-interface and the Iu+ interface respectively with no differentiation between NAS and AS.

The main point is that, during the processes that UE (which stays in idle mode) switches between TAs of different ECNs, and when transfers UE information between two different ECNs, it is necessary for the original ECN to send the ECN (M) list related to the UE-joined MBMS service to the new ECN (step 2103 in the figure) via the "context transfer response" message, and how to inform ECN(M) of the related information (this process is illustrated in step 2104 in the figure). The TA update process between different ECNs is not focused on here. In the future, if the TA update process between different ECNs changes, such as signaling flow between ECN and HSS, no affect will be caused to the main content of present invention.

Figure 22:
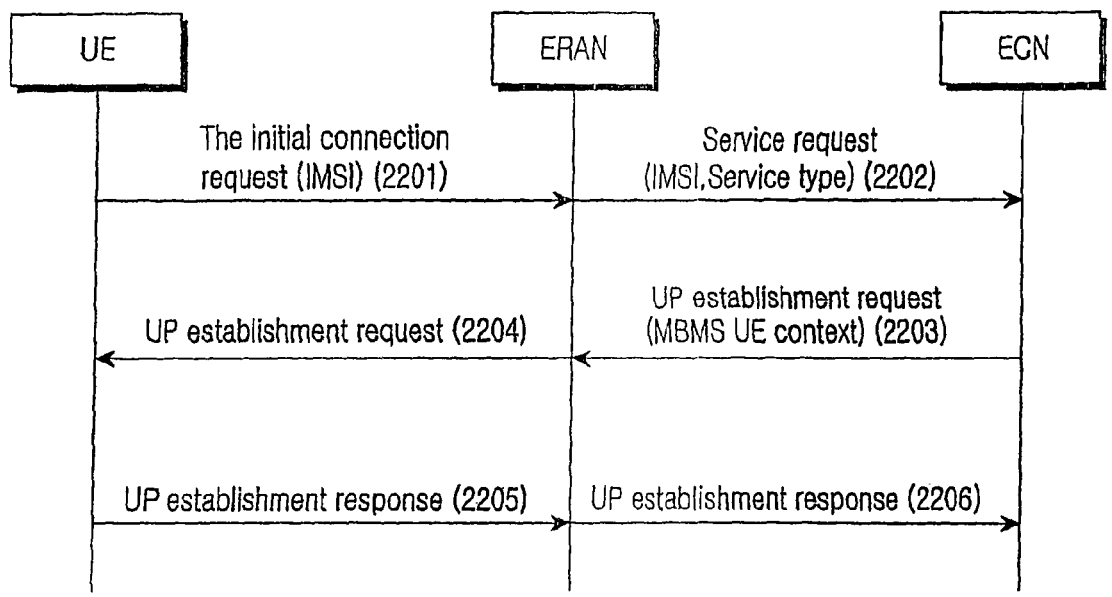
FIG. 22 shows a process that ECN sends the MBMS UE context to ERAN when the MBMS service joined UE switches from idle mode to activated mode.

When UE switches from the LTE idle mode into activated, ECN sends the "MBMS UE context information" to the ERAN (as shown in FIG. 22) via the process of establishing the user plane between the ECN and the ERAN.

With reference to FIG. 22, in step 2201, the UE sends the initial connection request message to the ERAN, including parameters such as the UE identifier (e.g., IMSI), the radio access capacity for the UE and so on. After the ERAN receives this message, in step 2202, it sends the "service request" message to the ECN (viz., the ECN(R)), including the parameters such as the UE identifier, the service type and so on.

In step 2203, the ECN sends the "UP establishment request" message to the ERAN, including necessary parameters for the establishment of user plane such as the user plane identifier, Qos and so on. If the UE has joined in MBMS service, the message also includes the MBMS UE context. The MBMS UE context refers to the identifier list of UE-joined MBMS service.

After the ERAN receives the "UP establishment request" message, it saves the MBMS UE context if the MBMS UE context is included in this message. 2204 the ERAN sends the "UP establishment request" message to the UE.

In step 2205, the UE configures the resource according to the "UP establishment request" message, then it sends the "UP establishment response" message to the ERAN. In step 2206, the ERAN sends the "UP establishment response" message to ECN(R).

Here, the step 2203 is not only suitable for the MBMS data transmission path supported in FIG. 17, but also suitable for any other ones. It has nothing to do with the data transmission path. Here, the case that UE switches from LTE idle mode into activated is taken as the example to illustrate the process that ECN sends the "MBMS UE context information" to the ERAN with the "UP establishment request" message. If the process that UE switches from the LTE idle mode into activated changes (for instance, the number of messages changes), no affect will be caused to the main content of present invention.

How ERAN operates during the process that UE switches from LTE idle mode into activated is consistent with that described in FIG. 16, no detail will be given here. The operation flow for the ECN is illustrated in FIG. 23.

Figure 23:
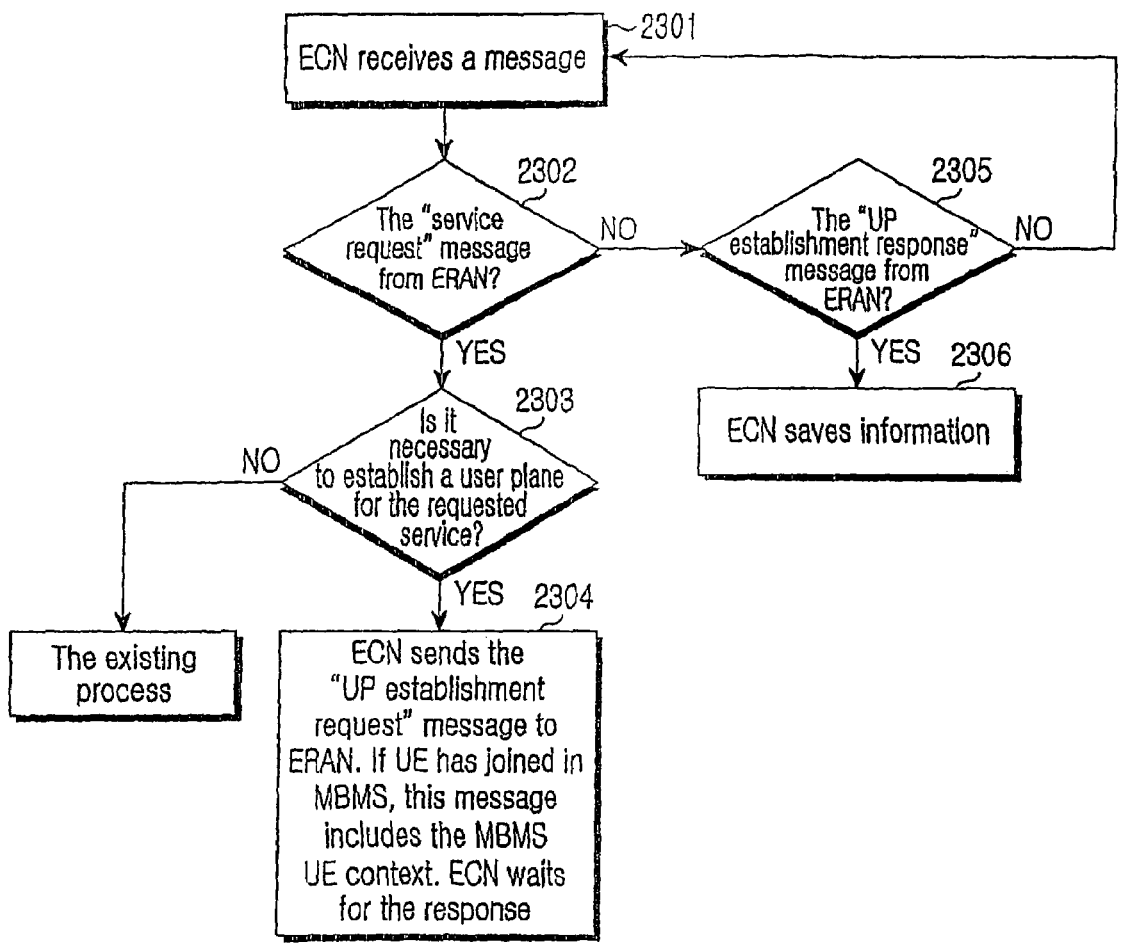
FIG. 23 shows operation flow of ECN corresponding to an exemplary embodiment in FIG. 22.

With reference to FIG. 23, in step 2301, the ECN receives a message, in step 2302 and the ECN has received the service request message from the ERAN. In step 2303, if it is necessary to establish a user plane for the requested service, in step 2304, ECN sends the "UP establishment request" message to the ERAN, including the configuration information on the user plane. If the UE has joined in one or more MBMS services, this message also includes the MBMS UE context. The MBMS UE context refers to the identifier list of the MBMS that UE has joined in. ECN waits for the response. Here, no detail will be given to the cases that no necessary user plane is established for the requested service.

In step 2305, if the ECN has received the "UP establishment response" message from the ERAN, in step 2306, it saves the related information such as the identifier of the user plane allocated by ERAN.

Figure 24:
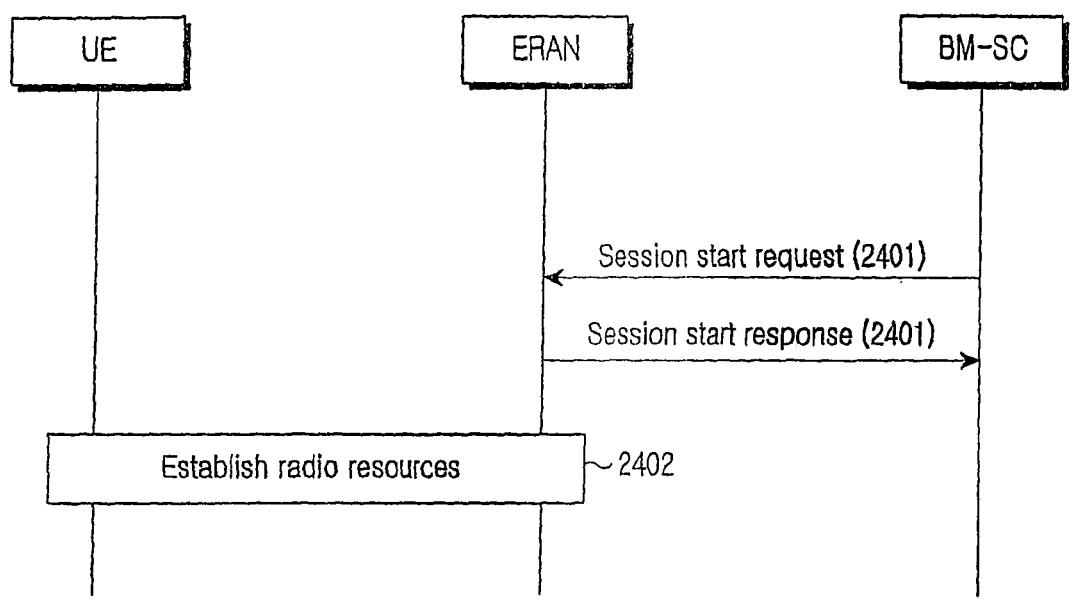
FIG. 24 shows a third exemplary method on MBMS service sessin starting.

In the MBMS network structure, the third method with which the MBMS service session starts is illustrated in FIG. 24. Now, detailed description on this Figure will be given.

With reference to FIG. 24, in step 2401, the BM-SC sends the "MBMS session start request" message to the ERANs in the downstream node list of the MBMS bearer context to indicate the start of the transmission, including such attributes of the MBMS session as the MBMS service identifier, the QoS, the MBMS service area, the session identifier, the estimated time period of the session, broadcast or multicast and so on. The problem of the BM-SC obtaining the downstream nodes ERANs will be illustrated with FIG. 25. The BM-SC sets the state of MBMS bearer context as activated. The ERAN creates the MBMS service context for the broadcast MBMS service. The ERAN saves the session attributes in the MBMS bearer context and sets the state of service context as activated. The ERAN sends the "session start response" message to the BM-SC. The ERAN creates the MBMS service context in the following cases: when the ERAN receives the notification from the ECN that UE has joined in MBMS service and when the ERAN receives the session start request from BM-SC. In the cases above, if the ERAN has no MBMS service context yet, it creates the MBMS service context.

In step 2402, the ERAN establishes necessary radio resources to transmit MBMS data to related UEs.

Figure 25:
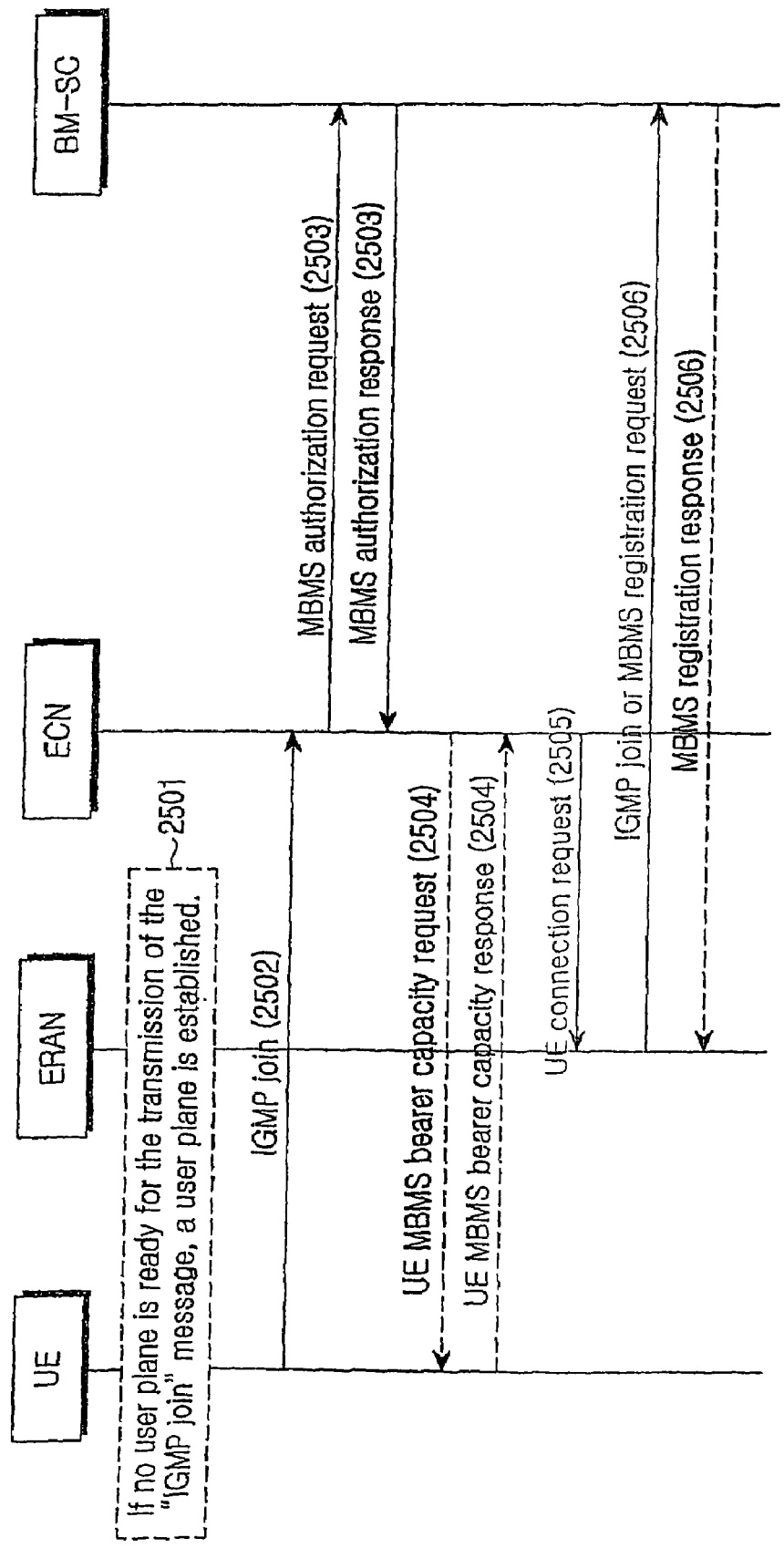
FIG. 25 shows a MBMS data transmission path that supports FIG. 24, and a method that UE joins in MBMS service.

Supporting the MBMS data transmission path illustrated in FIG. 24, FIG. 25 describes the process that UE joins in MBMS service. Now, detailed description on this figure will be given.

With reference to FIG. 25, in step 2501, if no user plane is ready for the transmission of the "IGMP join" message, the user plane is established. However, the present invention does not focus on the process of establishing a user plane, so that corresponding detailed technical description is omitted.

In step 2502, the UE sends the "IGMP join" message to ECN through existing user plane or the one established in step

2501. The message includes the parameter: IP multicast address, which can indicate certain MBMS multicast service or certain multicast service from external data network.

In step 2503, the ECN(R) performs signaling interaction with the BM-SC to authorize the UE. The MBMS authorization response message includes the APN.

In step 2504, if the ECN does not save the information on UE MBMS capacity, it sends the "UE MBMS bearer capacity request" message to the UE to require the information on the MBMS bearer capacity of the UE. This message may be either the NAS one, or the concatenation of NAS and AS. The ECN sends the Iu+ message "UE MBMS bearer capacity request" to the ERAN. After the ERAN receives this message, it sends an air-interface message "UE MBMS bearer capacity request" to the UE. After the UE receives this message, it sends the "UE MBMS bearer capacity response" message, including the MBMS bearer capacity of the UE. Similar to the request message, the response one may be either NAS one or the concatenation of NAS and AS, which are the two messages of the air-interface one and the Iu+ interface one respectively. After the ECN receives the response message, it saves the MBMS bearer capacity of the UE. According to the MBMS bearer capacity of the UE, if the UE has no MBMS capacity, the ECN rejects the UE joining in the MBMS service and terminates the process that UE joins in the MBMS service.

In step 2505, the ECN sends the "UE connection request" message to the ERAN, including the identifier of the MBMS that UE has joined in, the IP multicast address and the APN.

In step 2506, if the UE is the first one in this ERAN to join in this MBMS service, the ERAN registers to the BM-SC. Two methods are adopted here. One is that ERAN sends the "IGMP join" message to the BM-SC. The other is that the ERAN sends the "MBMS registration request" message to the BM-SC, including the IP multicast address and the APN. After the BM-SC receives the "IGMP join" or "MBMS registration request" message, it saves the ERAN in the list of the downstream node of the MBMS bearer context. In the method for the ECN sending the "MBMS registration response" message to the BM-SC, the BM-SC sends the "MBMS registration request" message to the ERAN.

During the process that UE joins MBMS service, if ECN has no information on the MBMS bearer capacity of the UE, it requests for it. Another method with which ECN obtains the information on the MBMS bearer capacity of the UE is that UE sends its MBMS bearer capacity to the network via messages like the initial connection request one, etc. when it switches into the connection mode, as shown in FIG. 26.

Figure 26:
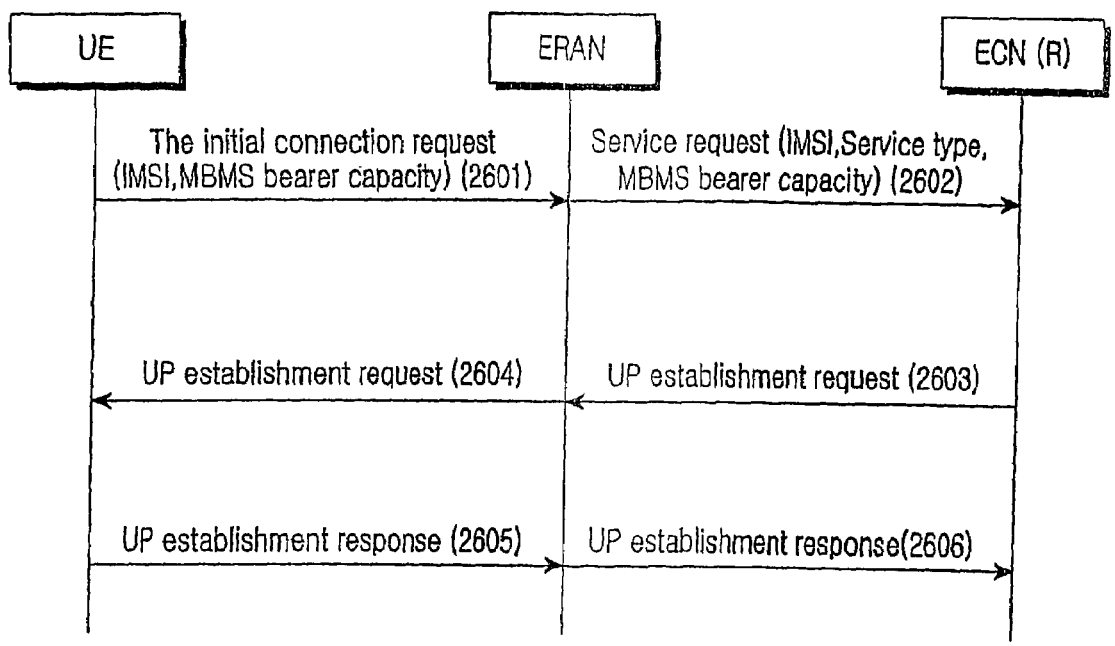
FIG. 26 shows the process that UE sends the MBMS bearing capacity to the network when it switches into the connection mode.

With reference to FIG. 26, in step 2601, the UE sends the "Initial connection request" message to ERAN, including such parameters as the UE identifier (e.g., IMSI), the radio access capacity of the UE and so on. If the UE supports the MBMS service, this message also includes the UE MBMS bearer capacity. After the ERAN receives this message, 2602 the ERAN sends the service request message to the ECN, including the UE identifier, the service type. If the air-interface message "initial connection request" includes the information on the MBMS bearer capacity of the UE, the message (sent from ERAN to ECN) also includes the MBMS bearer capacity of the UE. The ECN saves the MBMS bearer capacity of the UE.

In step 2603, the ECN sends the "UP establishment request" message to the ERAN, including necessary parameters for the establishment of user plane such as the user plane identifier, Qos and so on.

After the ERAN receives the "UP establishment request" message, in step 2604, it sends the "UP establishment request" message to the UE.

In step 2605, the UE configures the resource according to the "UP establishment request" message, then it sends the "UP establishment response" message to the ERAN. In step 2606, the ERAN sends the "UP establishment response" message to the ECN.

With the method of the UE sending the MBMS bearer capacity to the network, when the UE joins in MBMS service (as shown in FIG. 25), it is not necessary for the ECN to request the MBMS bearer capacity of the UE (step 2504).

When a UE (which has joined in certain MBMS service) moves into another ERAN, it is necessary for the ERAN to register to the BM-SC (i.e., to implement the step 2506) if the UE is the first one that joins in the MBMS service for the new ERAN.

When a UE (which has joined in certain MBMS service) moves into a new TA, it is necessary for the ECN to send the "UE connection request" message to all ERANs of the TA if the UE is the first one that joins in the MBMS service for the new TA. If no other UE within the ERANs of this TA has joined in certain MBMS service, it is necessary for ERANs to register to BM-SC (to implement step 2506).

When a UE (which has joined in MBMS service) switches into the idle mode, the ECN sends the "UE connection request" message to all ERANs of the TA. For the ERANs that have not registered to the BM-SC, they need to implement step 2506 to register to the BM-SC.

In conclusion, when the ERAN receives the "UE connection request" message from the ECN, it sends the messages in step 2506 to the BM-SC if it has not registered the MBMS service requested in the "UE connection request" message.

When the UE (which is the last one joined in the MBMS service) leaves or moves away, it is necessary for the ERANs to de-register with the BM-SC. Following is the detail of the process: method 1, the ERAN sends an "IGMP leave" message to the BM-SC. After the BM-SC receives this message, it removes the ERAN from the downstream node list in the MBMS bearer context. Method 2, the ERAN sends a "MBMS de-registration" message to the BM-SC. After the BM-SC receives this message, it removes the ERAN from the downstream node list in the MBMS bearer context. The BM-SC sends the "MBMS de-registration response" message to the ERAN.

What is claimed is:

1. A method for starting a Multicast Broadcast Multimedia Service (MBMS) session in a Long-term evolution (LTE) system, the method comprising:
receiving, by a network entity (ECN) that offers the MBMS, an MBMS session start request message from a Broadcast and Multicast Service Center (BM-SC);
transmitting, by the ECN, an MBMS session start response message to the BM-SC;
transmitting, by the ECN, the MBMS session start request message to an ERAN;
receiving, by the ECN, the MBMS session start response message from the ERAN; and
transmitting, by the ERAN, MBMS data to the User Equipment.

2. The method according to claim 1, wherein the MBMS session start request message includes attributes for the MBMS session.

3. The method according to claim 2, wherein the attributes for the MBMS session includes at least one of an MBMS service identifier, a Quality of Service, an MBMS service area, an MBMS session identifier, a time period of the MBMS session, a broadcast transmission and a multicast transmission.

4. The method according to claim 1, wherein the ECN saves User Equipment (UE) context information, and the UE context information indicates the ERAN where LTE staying in an LTE activated mode is located.

5. The method according to claim 1, wherein the ECN saves User Equipment (UE) context information, and the UE context information indicates ERANs within a tracking area (TA) where UE staying in an LTE idle mode is located.

6. A network entity (ECN) that offers Multicast Broadcast Multimedia Service (MBMS) for starting an MBMS session in a Long-term evolution (LTE) system, the ECN comprising:
   a receiver for receiving an MBMS session start request message from a Broadcast and Multicast Service Center (BM-SC), for receiving an MBMS session start response message from an ERAN; and
   a transmitter for transmitting the MBMS session start response message to the BM-SC, for transmitting the MBMS session start request message to the ERAN;
   wherein MBMS data is transmitted from the ERAN to a User Equipment (UE) after the MBMS session start response message is received from the ERAN.

7. The ECN according to claim 6, wherein the MBMS session start request message includes attributes for the MBMS session.

8. The ECN according to claim 7, wherein the attributes for the MBMS session includes at least one of an MBMS service identifier, a Quality of Service, an MBMS service area, an MBMS session identifier, a time period of the MBMS session, a broadcast transmission and a multicast transmission.

9. The ECN according to claim 6, wherein the ECN saves UE context information, the UE context information indicates the ERAN where UE staying in an LTE activated mode is located.

10. The ECN according to claim 6, wherein the ECN saves UE context information, the UE context information indicates ERANs within a tracking area (TA) where UE staying in an LTE idle mode is located.

* * * * *

UNITED STATES PATENT AND TRADEMARK OFFICE
CERTIFICATE OF CORRECTION

PATENT NO.         : 8,165,053 B2                                        Page 1 of 1
APPLICATION NO.    : 12/220469
DATED              : April 24, 2012
INVENTOR(S)        : Lixiang Xu et al.

It is certified that error appears in the above-identified patent and that said Letters Patent is hereby corrected as shown below:

Column 21, Claim 4, Line 6 should read as follows:
--...the ERAN where UE staying...--

Signed and Sealed this
Thirtieth Day of October, 2012

David J. Kappos
*Director of the United States Patent and Trademark Office*